US010521068B2

United States Patent
Joo et al.

(10) Patent No.: US 10,521,068 B2
(45) Date of Patent: Dec. 31, 2019

(54) PORTABLE DEVICE AND SCREEN DISPLAYING METHOD THEREOF

(71) Applicant: Samsung Electronics Co., Ltd., Gyeonggi-do (KR)

(72) Inventors: Jong-Sung Joo, Seoul (KR); Bo-Keun Kim, Gyeonggi-do (KR); Kyu-Ok Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 1058 days.

(21) Appl. No.: 14/294,733

(22) Filed: Jun. 3, 2014

(65) Prior Publication Data

US 2015/0007066 A1 Jan. 1, 2015

(30) Foreign Application Priority Data

Jul. 1, 2013 (KR) ........................ 10-2013-0076737

(51) Int. Cl.
*G06F 3/0481* (2013.01)
*G06F 3/0482* (2013.01)
(Continued)

(52) U.S. Cl.
CPC .......... *G06F 3/0481* (2013.01); *G06F 3/0482* (2013.01); *G06F 3/0488* (2013.01);
(Continued)

(58) Field of Classification Search
CPC ...... G06F 3/0416; G06F 3/0412; G06F 3/044; G06F 3/017; G06F 3/0346; G06F 3/04845; G06F 3/1454; G06F 3/023; G06F 3/041; G06F 3/0482; G06F 3/04842; G06F 3/0485; G06F 3/1423; G06F 3/1446; G06F 3/147; G06F 1/16; G06F 1/1635; G06F 1/1637; G06F 1/1656; G06F 1/1698; G06F 1/3262; G06F 1/1626; G06F 1/163; G06F 1/1632;
(Continued)

(56) References Cited

U.S. PATENT DOCUMENTS

| 5,170,172 A | 12/1992 | Weinstein |
| 5,187,808 A * | 2/1993 | Thompson ............ H04W 24/00 455/518 |

(Continued)

FOREIGN PATENT DOCUMENTS

| EP | 2632190 A1 * | 8/2013 | ............ H04W 4/023 |
| JP | 2012-083209 | 4/2012 | |
| WO | WO 2004/075169 | 9/2004 | |

OTHER PUBLICATIONS

European Search Report dated Sep. 28, 2016 issued in counterpart application No. 14174965.5-1972, 16 pages.
(Continued)

*Primary Examiner* — Scott T Baderman
*Assistant Examiner* — Erik V Stitt
(74) *Attorney, Agent, or Firm* — The Farrell Law Firm, P.C.

(57) ABSTRACT

A portable device and a screen displaying method of a portable device are provided. The method includes displaying a screen of an executed application on a screen of a portable device; detecting an approaching direction of an external device by using a sensor; and overlapping a directional layer for content sharing corresponding to the approaching direction of the external device, on the screen of the application.

24 Claims, 21 Drawing Sheets

(51) Int. Cl.
*G06F 3/0483* (2013.01)
*G06F 3/0488* (2013.01)
*H04W 4/08* (2009.01)
*H04W 4/02* (2018.01)
*G06F 3/14* (2006.01)

(52) U.S. Cl.
CPC .......... *G06F 3/1423* (2013.01); *G06F 3/1454* (2013.01); *H04W 4/026* (2013.01); *H04W 4/08* (2013.01); *G06F 2203/04803* (2013.01)

(58) Field of Classification Search
CPC ............. G06F 1/3265; G06F 17/30584; G06F 17/30958; G06F 2200/1634; G06F 2203/04101; G06F 2203/04103; G06F 2203/04104; G06F 2203/04108; G06F 2203/04112; G06F 2203/04803; G06F 2203/04806; G06F 2203/04102; G06F 2203/04111; G06F 3/1438; G06F 3/038; G06F 9/4443; G06F 3/0481
See application file for complete search history.

(56) References Cited

U.S. PATENT DOCUMENTS

| | | | |
|---|---|---|---|
| 2009/0098827 A1* | 4/2009 | Koyama | H01Q 1/243 455/41.2 |
| 2012/0054355 A1 | 3/2012 | Arrasvuori et al. | |
| 2012/0083283 A1 | 4/2012 | Phan et al. | |
| 2012/0129540 A1 | 5/2012 | Hakola et al. | |
| 2012/0206319 A1 | 8/2012 | Lucero et al. | |
| 2013/0196718 A1 | 8/2013 | Tani et al. | |

OTHER PUBLICATIONS

European Search Report dated Feb. 8, 2018 issued in counterpart application No. 14174965.5-1216, 12 pages.
European Search Report dated Oct. 18, 2018 issued in counterpart application No. 14174965.5-1216, 11 pages.
Marquardt, Nicolai et al., Gradual Engagement: Facilitating Information Exchange between Digital Devices as a Function of Proximity, ITS'12, Nov. 11-14, 2012, Cambridge, Massachusetts, 10 pages.
Korean Office Action dated Sep. 26, 2019 issued in counterpart application No. 10-2013-0076737, 15 pages.

* cited by examiner

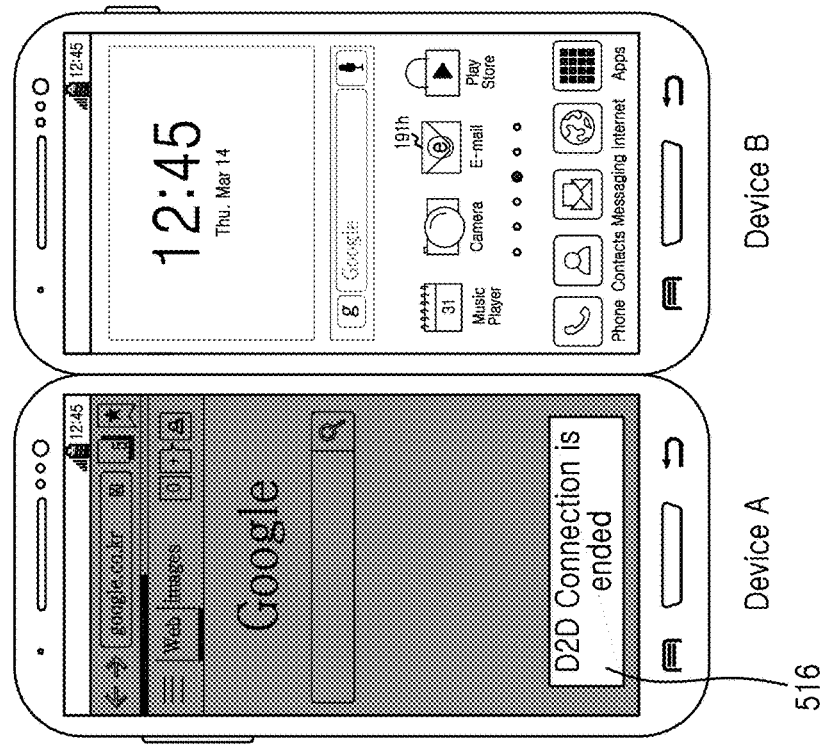
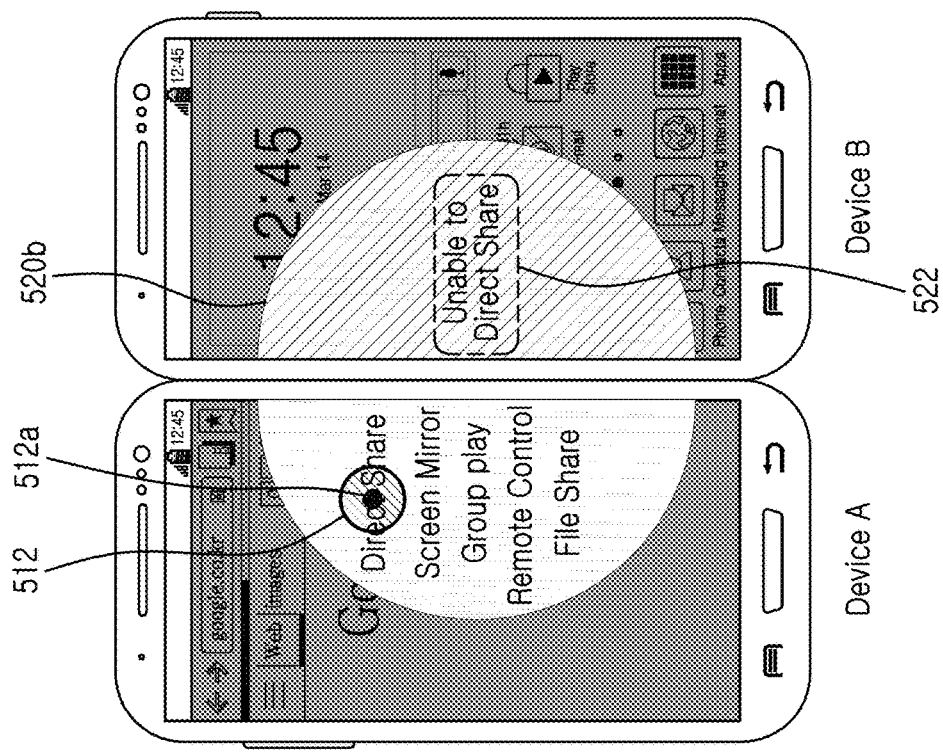
FIG.10B
FIG.10A

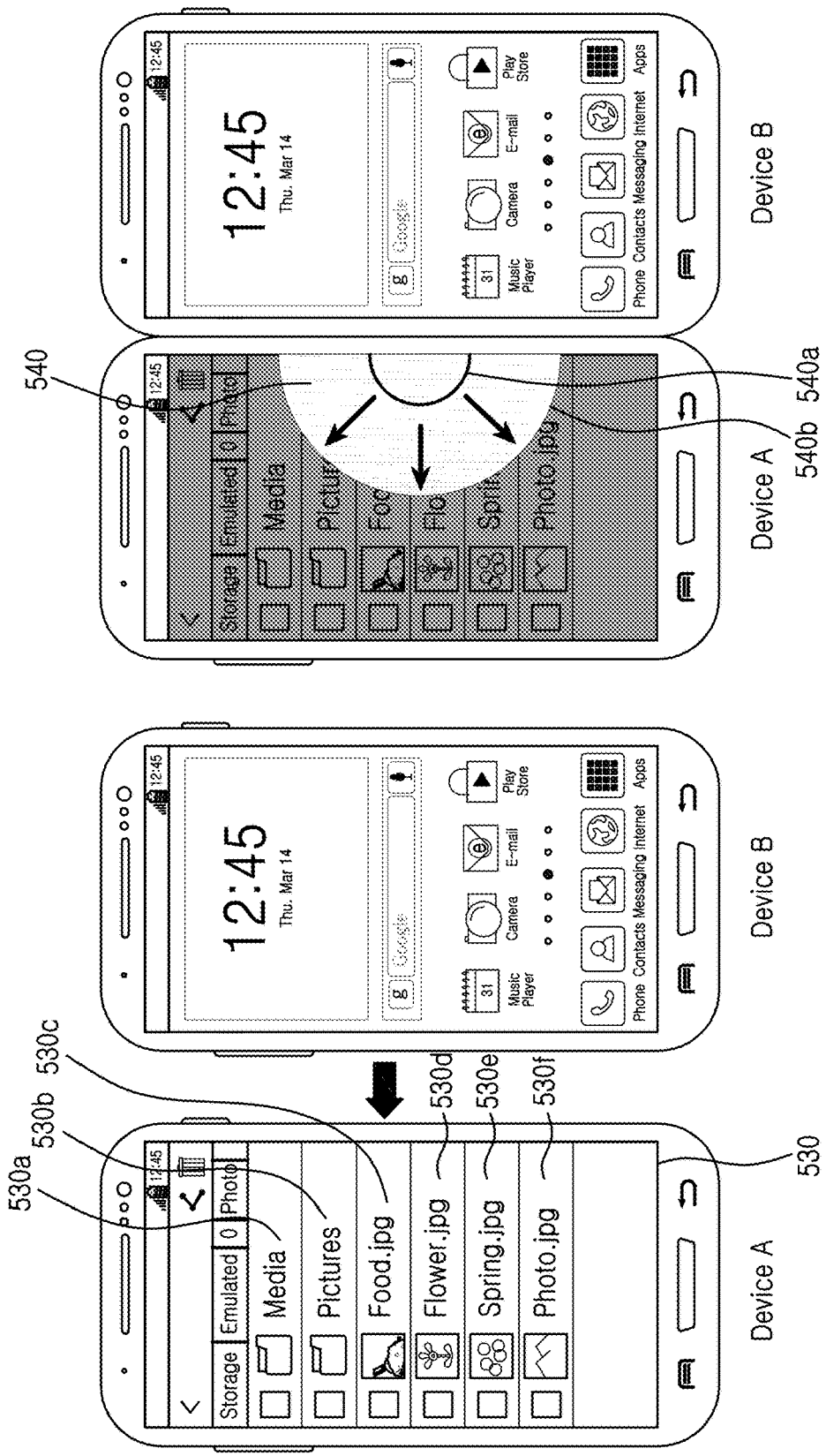

PORTABLE DEVICE AND SCREEN DISPLAYING METHOD THEREOF

PRIORITY

This application claims priority under 35 U.S.C. § 119 to an application filed in the Korean Intellectual Property Office on Jul. 1, 2013 and assigned Serial No. 10-2013-0076737, the contents of which are incorporated herein by reference.

BACKGROUND OF THE INVENTION

1. Field of the Invention

The present invention relates generally to a portable device and a screen displaying method thereof.

2. Description of the Related Art

Various services and functions provided by portable devices have been expanding gradually, and various applications executable in the portable devices are under development. Accordingly, applications may be installed on a portable device having a touch screen, such as a smart phone, a mobile phone, a notebook PC, and a tablet PC.

When content stored in a portable device or downloadable content is shared with an external device, a user may need to first search the external device (i.e., a sharing target). Additionally, the user may select a content list and content of the selected external device and share it. Furthermore, the user may need to perform a complex operation for search/selection of the external device and search/selection of content.

SUMMARY OF THE INVENTION

The present invention has been made to substantially solve at least the above problems and/or disadvantages and to provide at least the advantages below. Accordingly, an aspect of the present invention is to provide a portable device and a screen displaying method thereof.

An aspect of the present invention provides a portable device displaying a directional layer for content sharing corresponding to an approaching direction of an external device and a screen displaying method thereof.

An aspect of the present invention provides a portable device displaying a directional layer from an approaching direction of an external device corresponding to an approaching direction of an external device and a screen displaying method thereof.

An aspect of the present invention provides a portable device displaying a directional layer from an approaching direction of a plurality of external devices corresponding to an approaching direction of a plurality of external devices and a screen displaying method thereof.

An aspect of the present invention provides a portable device displaying a directional layer from one side or one edge of an approaching direction of an external device corresponding to an approaching direction of an external device and a screen displaying method thereof.

An aspect of the present invention provides a portable device displaying a directional layer provided as a portion of a geometric figure from an approaching direction of an external device corresponding to an approaching direction of an external device and a screen displaying method thereof.

An aspect of the present invention provides a portable device selecting a command displayed on a directional layer corresponding to an approaching direction of an external device and transmitting content corresponding to the selected command to an external device and a screen displaying method thereof.

An aspect of the present invention provides a portable device displaying a directional layer for content sharing corresponding to a magnetic intensity of an approaching external device and a screen displaying method thereof.

An aspect of the present invention provides a portable device displaying a directional layer for content sharing corresponding to an approaching direction and magnetic intensity of an external device and a screen displaying method thereof.

According to an aspect of the present invention, a screen displaying method of a portable device is provided. The method includes displaying a screen of an executed application on a screen of a portable device; detecting an approaching direction of an external device by using a sensor; and overlapping a directional layer for content sharing corresponding to the approaching direction of the external device, on the screen of the application.

According to another aspect of the present invention, a screen displaying method of a portable device is provided. The method includes displaying a screen of an application; detecting an approaching direction of an external device; displaying a directional layer corresponding to the detected approaching direction of the external device; displaying a first sub directional layer corresponding to the directional layer, on the external device; detecting an approaching direction of another external device connectible to the external device; and displaying a second sub directional layer corresponding to the directional layer, on the other external device, wherein the direction layer, the first sub directional layer, and the second sub directional layer form one geometric figure.

According to another aspect of the present invention, a portable device includes a screen; a communication unit connectible to an external device; a sensor unit detecting an approaching direction of the external device; and a control unit controlling the screen, the sensor unit, and the communication unit, wherein the control unit displays a screen of an executed application on the screen, and overlaps a directional layer for content sharing corresponding to the approaching direction of the external device detected through the sensor unit, on the screen of the application.

According to another aspect of the present invention, a screen displaying method of a portable device is provided. The method includes detecting an approaching direction of an external device by using a sensor; establishing a connection with the external device; and displaying a directional layer for content sharing corresponding to the approaching direction of the external device, on a screen, wherein the directional layer is displayed as a portion of a geometric figure.

BRIEF DESCRIPTION OF THE DRAWINGS

The above and other objects, features and advantages of the present invention will become more apparent from the following detailed description when taken in conjunction with the accompanying drawings in which:

FIGS. 10A and 10B are views illustrating a screen displaying method of a portable device according to an embodiment of the present invention.

FIGS. 11A and 11B are views illustrating a screen displaying method of a portable device according to another embodiment of the present invention;

DETAILED DESCRIPTION OF EMBODIMENTS OF THE PRESENT INVENTION

Figure 1:
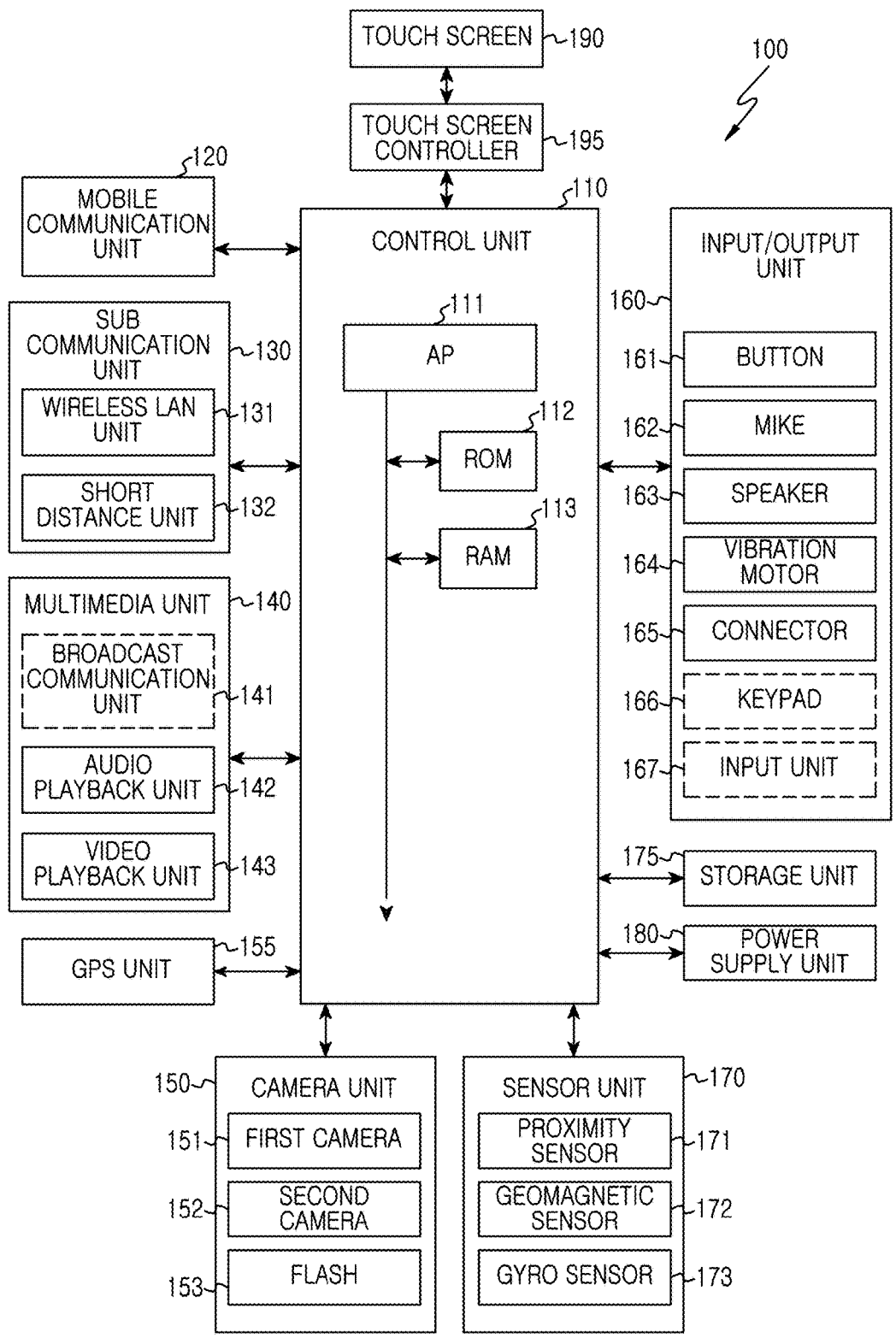
FIG. 1 is a block diagram illustrating a portable device according to an embodiment of the present invention.

Hereinafter, embodiments of the present invention will be described in more detail with reference to the accompanying drawings. Furthermore, a method of manufacturing and using the present invention will be described in more detail with reference to the accompanying drawings. Like reference numerals or symbols refer to like elements or components that substantially perform the same function throughout.

Although terms like "first" and "second" may be used to describe various components, the components are not limited to the terms. These terms are used only to distinguish one component from other components. For example, a first component may be referred to as a second component and vice versa without being departing from the scope of the present invention. As used herein, the term and/or includes any and all combinations of one or more of the associated listed items.

The term "application" refers to software executable on a computer operating system (OS) or a mobile OS by a user directly. Examples of such applications include a word processor application, spread sheet application, social network system (SNS) application, chatting application, map application, music player application, and video player application.

A "magnetic substance" refers to a material having magnetism, for example, a material magnetized in a magnetic field. The magnetic substance may include a ferromagnetic substance, a paramagnetic substance, a diamagnetic substance, or a ferrimagnetic substance. The magnetic substance may be included in a speaker, a motor, a hard disk drive, magnetic resonance imaging (MRI), a cover including magnetic substance to couple to a portable device, or a portable device. A portable device 100 according to an embodiment of the present invention may include one or more magnetic substances.

A widget refers to a mini application of a graphic user interface (GUI) for smoothly supporting an interaction between a user and an application or OS. For example, widgets include a weather widget, a calculator widget, and a clock widget. The widget may be installed in a shortcut icon form to a desktop, a portable device, a blog, an Internet café, or a personal homepage, and may be used to directly execute a corresponding service by a click instead of a web browser. Additionally, the widget may include a shortcut icon for a designated path or a shortcut icon for executing a designated application.

Terms used in this specification are used for describing specific embodiments, and are not intended to limit the scope of the present invention. The terms of a singular form may include plural forms unless referred to in the contrary. For example, a user may be a user of a portable device or a user of an external device. A user may be one or two users. The meaning of "include," "comprise," "including," or "comprising," specifies a property, a region, a fixed number, a step, a process, an element and/or a component but does not exclude other properties, regions, fixed numbers, steps, processes, elements and/or components. Like reference numerals refer to like elements throughout.

The present disclosure relates to a portable device for transmitting content by using a direction of an approaching external device and a screen displaying method thereof.

FIG. 1 is a block diagram illustrating a portable device according to an embodiment of the present invention, such as a portable electronic device.

Referring to FIG. 1, the portable device 100 may be connected to an external device via a wired/wireless network by using a mobile communication unit 120, a sub communication unit 130, and a connector 165. The external device may include another electronic device, a mobile phone, a smart phone, a tablet PC, an interactive white board, and a server. The portable device 100 is a device having a touch screen and transmits/receives data through a communication unit, and may have one or two touch screens. For example, the portable device 100 may include an MP3 player, a video player, a tablet PC, a 3D-TV, a smart TV, an LED TV, and an LCD TV. Additionally, the portable device 100 may include a device for transmitting/receiving data to/from a connectible another external device by using an interaction (e.g., a touch or a touch gesture) inputted from a touch screen of the portable device 100.

The portable device 100 includes a touch screen 190 and a touch screen controller 195. The portable device 100 further includes a control unit 110, the mobile communication unit 120, the sub communication unit 130, a multimedia unit 140, a camera unit 150, a GPS unit 155, an input/output unit 160, a sensor unit 170, a storage unit 175, and a power supply unit 180.

The sub communication unit 130 includes at least one of a wireless LAN unit 131 and a short distance communication unit 132, and the multimedia unit 140 includes at least one of a broadcast communication unit 141, an audio playback unit 142, and a video playback unit 143. The camera unit 150 includes at least one of a first camera 151 and a second camera 152, and a flash 153. The input/output unit 160 includes at least one of a button 161, a mike 162, a speaker 163, a vibration motor 164, a connector 165, a keypad 166, and an input unit 167. The sensor unit 170 includes a proximity sensor 171, a geomagnetic sensor 172, and a gyro sensor 173.

The control unit 110 may include an application processor (AP) 111, a ROM 112 where a control program for controlling the portable device 100 is stored, and a RAM 113 that stores signals or data inputted from outside of the portable device 100, or is used as a storage area for various operations performed in the portable device 100.

The control unit 110 controls an overall operation of the portable device 100 and a signal flow between the internal components 120 to 195 of the portable device 100, and processes data. The control unit 110 controls power supply from the power supply unit 180 to the internal components 120 to 195. Additionally, when a user's input or set and stored conditions are satisfied, the control unit 190 executes OS and various applications stored in the storage unit 175. In an embodiment of the present invention, the term 'control unit' includes the AP 111, the ROM 112, and the RAM 113.

The AP 111 may include a graphic processing unit (GPU) for graphic processing. The AP 111 may be implemented with a core and a GPU in a system on chip (SoC). The AP 111 may include a single core, a dual core, a triple core, a quad core, and a multiple core of thereof. Additionally, the AP 111, the ROM 112, and the RAM 113 may be connected to each other through an internal bus.

The control unit 110 controls the mobile communication unit 120, the sub communication unit 130, the multimedia unit 140, the camera unit 150, the GPS unit 155, the input/output unit 160, the sensor unit 170, the storage unit 175, the power supply unit 180, the touch screen 190, and the touch screen controller 195.

The control unit displays the screen of an application executed on a touch screen of a portable device, detects a direction of a connectible external device by using a sensor, and overlaps a direction layer corresponding to an approaching direction of the external device on the screen of the application to display it.

The control unit displays a command list on the directional layer, and may activate and display only an executable command in the command list.

The control unit may display the screen of an application to be distinguished from the directional layer in response to the display of the directional layer. The control unit may gradually display at least one of one side and one edge of the screen of an application so as to match the directional layer to the approaching direction of an external device. The control unit may detect the slope of a portable device by using a sensor and may display the directional layer to match the detected slope. The control unit may provide the directional layer as part of at least one geometrical figure corresponding to the approaching direction of an external device. The control unit may provide the directional layer as part of at least one geometrical figure corresponding to a signal intensity received from an external device. The control unit may display a sub directional layer corresponding to the directional layer on a display screen of the external device. The control unit may detect a connection with an external device, and if the external device is not connected, may allow the displayed directional layer to disappear gradually.

The control unit may detect a touch from the directional layer, detect a continuous movement of the touch in an opposite direction of the detected direction, and control the directional layer to disappear gradually in response to the continuous movement of the detected touch. The control unit may detect a touch from one of activated commands, and transmit a content corresponding to the command to an external device through a communication unit in response to the detected touch.

The control unit may provide at least one of visual feedback, auditory feedback, and haptic feedback, which correspond to transmission progression of a displayed content between a portable device and an external device. The control unit may provide at least one of visual feedback, auditory feedback, and haptic feedback, which correspond to transmission progression of a displayed content between a portable device and an external device.

The control unit may change one of the color of a directional layer and the color of a sub directional layer in response to whether content is transmitted to the external device. The control unit may receive at least one selected content, i.e., a transmission target, and may transmit selected at least one content to an external device through a communication unit. The control unit may transmit a request on whether to share corresponding to selected content transmission to an external device.

The control unit may include at least one of the application screen, screen data configuring a screen, a Uniform Resource Locator (URL), an image file, a text file, an audio file, a video file, and an android installation file in selected content.

The control unit may change a geometrical figure of a directional layer displayed corresponding to content.

The control unit may display the screen of an application, detect an approaching direction of a connectible external device to display a directional layer corresponding to the approaching direction of the detected external device, display a first sub directional layer corresponding to the directional layer on the external device, detect an approaching direction of another external device connectible to the external device, display a second sub directional layer corresponding to the directional layer on the other external device, and form one geometrical figure by using the directional layer, the first sub directional layer, and the second sub directional layer.

The control unit may detect an approaching direction of the other external device from a portable device or a connected external device.

The control unit may detect a touch from one of commands displayed on the directional layer, and selectively transmit a content corresponding to the command to one of an external device or another external device in response to the detected touch.

The mobile communication unit 120 may be connected to an external device through a mobile communication by using one or two antennas in response to a control of the control unit. The mobile communication unit 120 transmits/receives wireless signals in order for a voice call, a video call, a text message (i.e., SMS), a multimedia message (i.e., MMS), and data communication with a mobile phone having phone numbers for making a call with the portable device 100, a smart phone, a tablet PC, or another portable device.

The sub communication unit 130 may include at least one of the wireless LAN unit 131 and the short distance communication unit 132. For example, the sub communication unit 130 may include only one of the wireless LAN unit 131 and the short distance communication unit 132, or both the wireless LAN unit 131 and the short distance communication unit 132.

The wireless LAN unit 131 may be connected to an access point wirelessly at a place where the access point is installed, in response to a control of the control unit. The wireless LAN unit 131 supports the wireless LAN standards (i.e., IEEE802.11x) of the Institute of Electrical and Electronics Engineers (IEEE). Additionally, the short distance communication unit 132 may perform short distance communication wirelessly between the portable device 100 and an external device, in response to a control of the control unit. The short distance communication may include Bluetooth, Bluetooth Low Energy, Infrared Data Association (IrDA), Wi-Fi, Ultra Wideband (UWB), and Near Field Communication (NFC).

According to an embodiment of the present invention, the term "communication unit" includes the mobile communication unit 120 and the sub communication unit 130.

A communication unit according to an embodiment of the present invention may connect a portable device to an approaching external device or another external device in response to a control of the control unit. The communication unit transmits selected content to an external device or another external device in response to a control of the control unit. The communication unit transmits/receives a sub directional layer corresponding to a directional layer and a control signal corresponding to a command list to/from an external device or another external device, in response to a control of the control unit.

The multimedia unit 140 includes the broadcast communication unit 141, the audio playback unit 142, or the video playback unit 143. The broadcast communication unit 141 may receive broadcast signals (e.g., TV broadcast signals, radio broadcast signals, or data broadcast signals) and broadcast additional information (e.g., Electric Program Guide (ESP) or Electric Service Guide (ESG)), which are transmitted from an external broadcasting station through a broadcast communication antenna, in response to a control of the control unit. Additionally, the control unit may play the received broadcast signal and broadcast information by using a touch screen, a video codec unit and an audio codec unit.

The audio playback unit 142 may play audio sources (e.g., audio files in an mp3, wma, ogg, or wav file extension) pre-stored in the storage unit 175 of the portable device 100 or received from the outside by using the audio codec unit, in response to a control of the control unit.

According to an embodiment of the present invention, the audio playback unit 142 may play a touch detected from the directional layer, continuous movement of a touch, and an auditory feedback (e.g., an output of an audio source stored in a storage unit) corresponding to content transmission or content transmission progression, through an audio codec unit in response to a control of the control unit.

The video playback unit 143 may play a digital video file (e.g., video files in an mpeg, mpg, mp4, avi, mov, or mkv file extension) pre-stored in the storage unit 175 of the portable device 100 or received from the outside, through a video codec unit in response to a control of the control unit. Most applications installable on the portable device 100 may play audio and video files through an audio codec unit or a video codec unit.

According to an embodiment of the present invention, the video playback unit 143 may play a touch detected from the directional layer, continuous movement of a touch, and a visual feedback (e.g., an output of a video source stored in a storage unit) corresponding to content transmission or content transmission progression, through a video codec unit in response to a control of the control unit.

The multimedia unit 140 may include the audio playback unit 142 and the video playback unit 143 in correspondence to the performance or structure of the portable device 100, excluding the broadcast communication unit 141. Additionally, the audio playback unit 142 or the video playback unit 143 of the multimedia unit 140 may be included in the control unit 110. In an embodiment of the present invention, the term "video codec unit" includes at least one video codec unit. Additionally, in an embodiment of the present invention, the term "audio codec unit" includes at least one audio codec unit.

Figure 2:
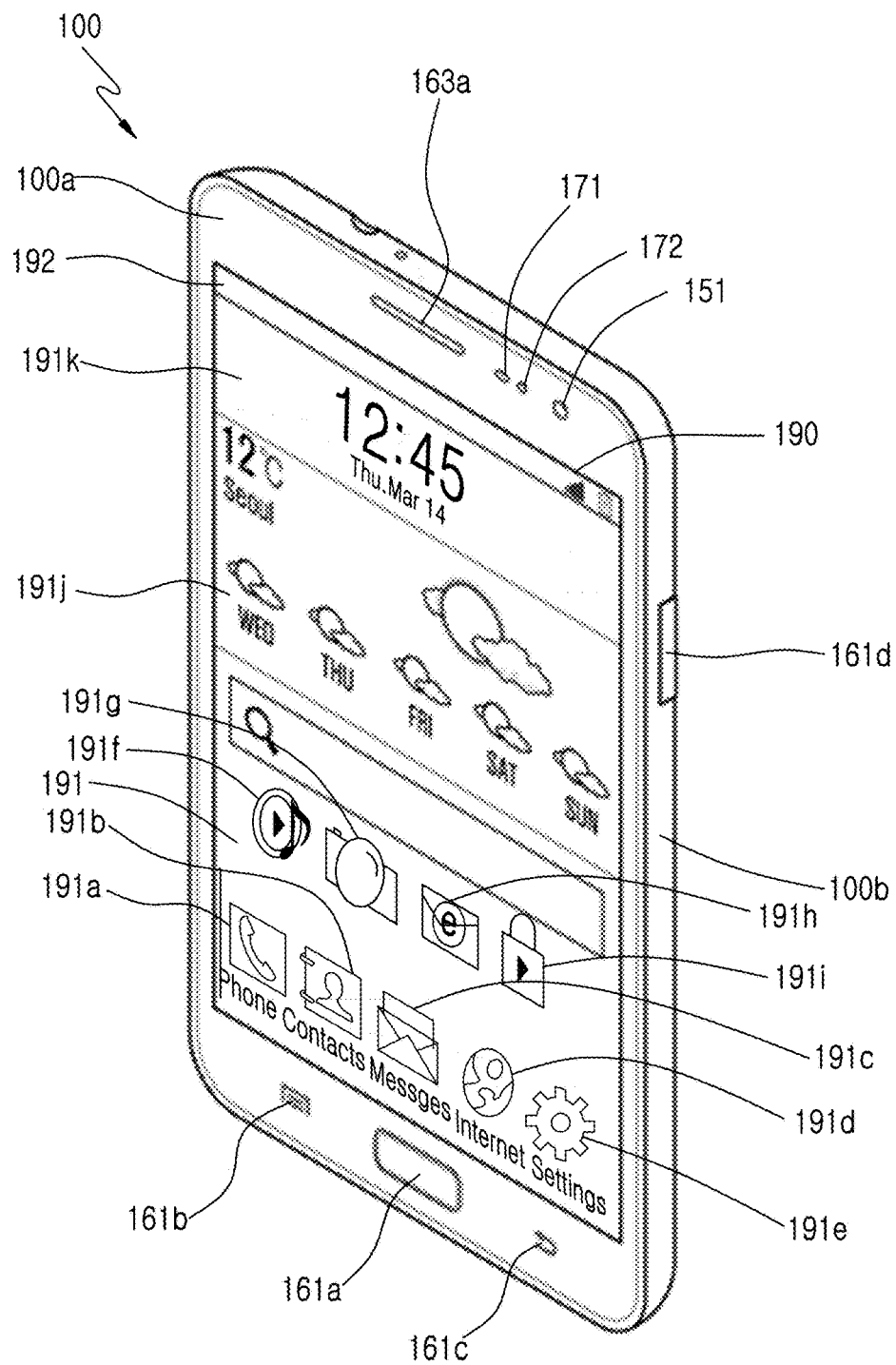
FIG. 2 is a front perspective view illustrating a portable device according to an embodiment of the present invention.
Figure 3:
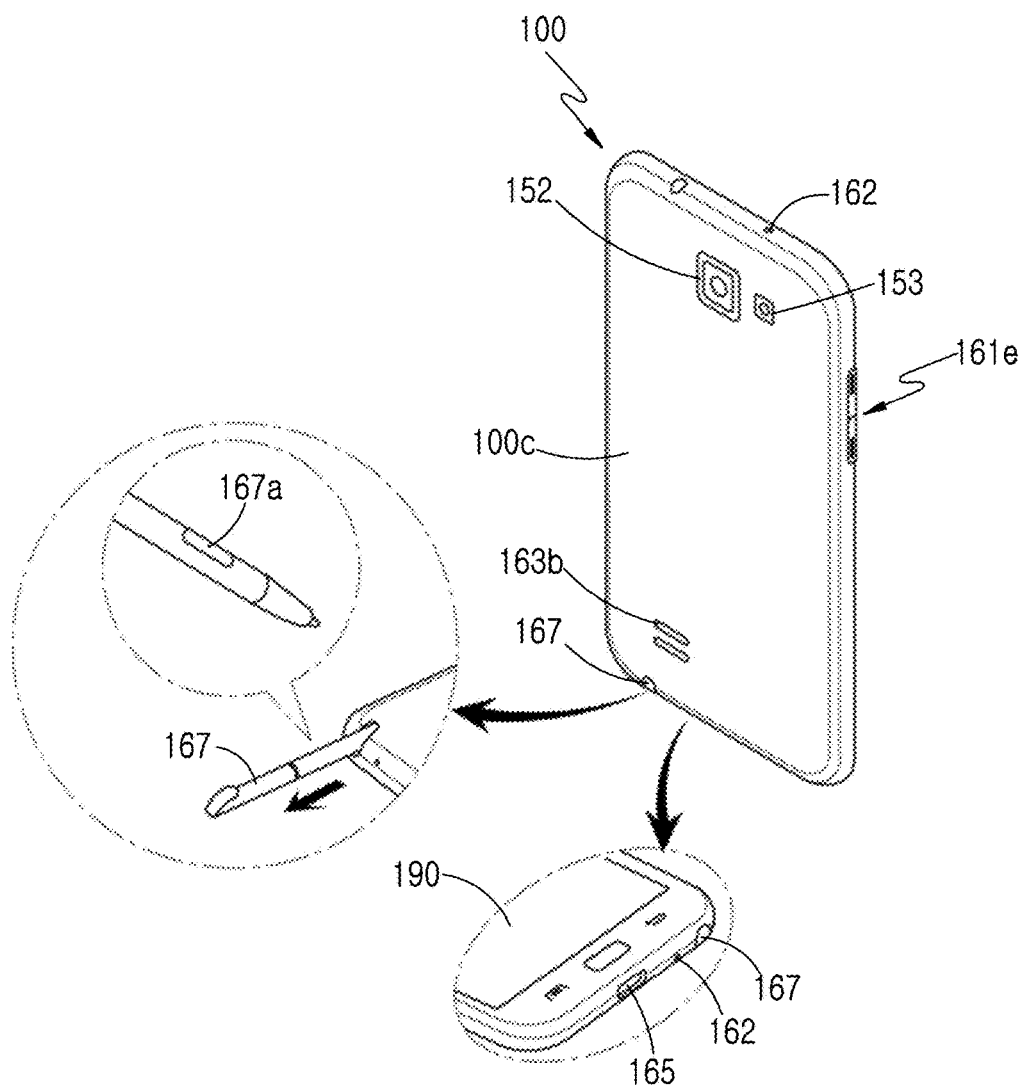
FIG. 3 is a rear perspective view illustrating a portable device according to an embodiment of the present invention.

The camera unit 150 may include at least one of a first camera 151 at the front 100*a* of FIG. 2 and a second camera 152 at the rear 100*c* of FIG. 3, which are used for capturing a still image or video in response to a control of the control unit. The camera unit 150 may include one or both of the first camera 151 and the second camera 152. Additionally, the first camera 151 or the second camera 152 may include an auxiliary light source (e.g., a flash 153) providing an amount of light required for shooting.

In response to a control of the control unit, when the first camera 151 is adjacent to an additional camera (e.g., a third camera not shown) at the front, for example, an interval between the first camera 151 at the front 100*a* and the additional camera is greater than about 2 cm and less than about 8 cm, the first camera 151 and the additional camera may capture an 3-D still image or a 3-D video. Additionally, when the second camera 152 is adjacent to an additional camera (e.g., a fourth camera not shown) installed at the rear, for example, an interval between the second camera 152 at the rear 100*c* and the additional camera is greater than about 2 cm and less than about 8 cm, the second camera 152 and the additional camera may capture an 3-D still image or a 3-D video. Additionally, the second camera 152 may perform wide-angle, telephoto and macro capturing by using an additional adaptor.

The GPS unit 155 receives information (e.g., accurate position information and time information of a GPS satellite receivable by the portable device 100) periodically from a plurality of GPS satellites on the earth's orbit. The portable device 100 obtains its position, speed, and time by using the information received from a plurality of GPS satellites.

The input/output unit 160 includes at least one button 161, a mike 162, a speaker 163, a vibration motor 164, a connector 165, a keypad 166, and an input unit 167.

Referring to the portable device 100 shown in FIGS. 1 to 3, the button 161 includes a menu button 161*b*, a home button 161*a*, and a back button 161*c* at the bottom of the front 100*a*. The button 161 may include a power/lock button 161*d* and at least one volume button 161*e* at the side 100*b*. In the portable device 100, the button 161 may include only the home button 161*a*. Additionally, in the portable device 100, the button 161 may be implemented with a touch button on the external of the touch screen 190 instead of a physical button. Additionally, in the portable device 100, the button 161 may be displayed as text or icon on the touch screen 190.

The mike 162 generates electrical signals by receiving voice or sound from the outside in response to a control of the control unit. The electrical signals generated by the mike 162 may be converted by an audio codec unit and stored in the storage unit 175 or outputted through the speaker 163. One or more mikes 162 may be disposed at the front 100a, the side 100b, or the rear 100c of the portable device 100. Additionally, one or more mikes 162 may be disposed at only the side 100b of the portable device 100.

The speaker 163 outputs sounds corresponding to various signals (for example, wireless signals, broadcast signals, audio sources, video files, or photo shooting) of the mobile communication unit 120, the sub communication unit 130, the multimedia unit 140, or the camera unit 150 through an audio codec unit, in response to a control of the control unit.

The speaker 163 outputs sound (e.g., a touch manipulation sound corresponding to a phone call or a photo capturing button manipulation sound) corresponding to a function performed by the portable device 100. At least one speaker 163 may be positioned at the front 100a, the side 100b, and the rear 100c of the portable device 100. Referring to the portable device 100 shown in FIGS. 1 to 3, speakers 163a and 163b are disposed at the front 100a and the rear 100c of the portable device 100, respectively. Moreover, both speakers 163a and 163b may be positioned at the front 100a of the portable device 100, or speaker 163a may be positioned at the front 100a of the portable device 100 and at least one speaker 163b may be positioned at the rear 100c of the portable device 100.

At least one speaker may be positioned at the side 100b of the portable device 100. The portable device 100 including at least one speaker at the side 100b may provide different sound output effects than a portable device not having a speaker at the side 100b and speakers at the front 100a and the rear 100c.

According to an embodiment of the present invention, the speaker 163 may output an auditory feedback corresponding to a touch detected from the directional layer, continuous movement of a touch, and content transmission or content transmission progression, in response to a control of the control unit.

The vibration motor 164 converts electrical signals into mechanical vibration in response to a control of the control unit. For example, the vibration motor 164 may include a linear vibration motor, a bar type vibration motor, a coin type vibration motor, or a piezoelectric vibration motor. When a voice call request is received from another portable device, the vibration motor 164 of the portable device 100 operates in a vibration mode in response to a control of the control unit. One or more vibration motors 164 may be positioned in the portable device 100. Additionally, the vibration motor 164 may vibrate the entire portable device 100 or only a portion of the portable device 100.

According to an embodiment of the present invention, the vibration motor 164 outputs a haptic feedback corresponding to a touch detected from the directional layer, continuous movement of a touch, and content transmission or content transmission progression, in response to a control of the control unit. Additionally, the vibration motor 164 may provide various types of haptic feedback (e.g., the intensity of vibration and a vibration duration time) in response to a control signal of the control unit.

The connector 165 may be used as an interface for connecting the portable device 100 to an external device or a power source. In response to a control of the control unit, the portable device 100 may transmit data stored in the storage unit 175 to an external device or receive data from an external device through a wired cable connected to the connector 165. The portable device 100 may receive power from a power source or charge a battery through a wired cable connected to the connector 165. Additionally, the portable device 100 may be connected to an external accessory (e.g., a keyboard dock) through the connector 165.

The keypad 166 receives a key input from a user in order to control the portable device 100. The keypad 166 includes a physical keypad at the front 100a of the portable device 100, a virtual keypad displayed on the touch screen 190, or a wirelessly connectible physical keypad. Those skilled in the art may easily understand that the physical keypad at the front 100a of the portable device 100 may be excluded according to the performance or structure of the portable device 100.

The input unit 167 allows a user to touch or select an object (e.g., a menu, a text, an image, a figure, an icon, and a shortcut icon) displayed on the touch screen 190 of the portable device 100 or the screen of an educational application (e.g., an individual screen, a public screen, and a management screen).

The input unit 167 allows a user to touch or select a content (e.g., a text file, an image file, an audio file, a video file, or a reduced student personal screen) displayed on the touch screen 190 of the portable device 100 or the screen of an educational application (e.g., an individual screen, a public screen, and a management screen).

The input unit 167 allows the user to input characters by touching a touch screen of a capacitive type, a resistive type, an electromagnetic induction type or an electromagnetic resonance type, or by using a virtual keyboard. The input unit 167 may include a haptic pen 167 where a built-in pen vibration device such as a vibration motor or an actuator vibrates by using control information received from a stylus or a communication unit of the electronic device 100.

The vibration device vibrates by using sensing information detected from a sensor (e.g., an accelerator sensor built in the input unit 167, instead of control information received from the portable device 100. Those skilled in the art may easily understand that the input unit 167 insertable into an insertion slot of the portable device 100 may be excluded according to the performance or structure of the portable device 100.

The sensor unit 170 includes at least one sensor detecting a state of the portable device 100. For example, the sensor unit 170 is disposed at the top of the front 100a of the portable device 100. The sensor unit 170 may include a magnetic sensor 172 detecting magnetism around the portable terminal 100, a proximity sensor 171, a gyro sensor 173 detecting a slope of the portable device 100 by using the rotary inertia of the portable device 100, an acceleration sensor detecting movement states of 3-axes (e.g., an x-axis, a y-axis, and z-axis) applied to the portable device 100, an illumination sensor detecting the amount of light around the portable device 100, a gravity sensor detecting an action direction of gravity, or an altimeter detecting the altitude by measuring atmospheric pressure.

The magnetic sensor 172 detects peripheral magnetism on the basis of x, y, and z axes. The magnetic sensor 172 transmits the intensity of magnetism detected based on each axis to the control unit. The control unit calculates the intensity of magnetism by summing up the received intensity of magnetism in each axis direction. The control unit calculates a magnetic direction by using the intensity of magnetism in each axis direction.

The sensor unit 170 may measure an acceleration added by the movement acceleration and a gravitational acceleration of the portable device 100, and may measure only gravitational acceleration when the portable device 100 does not move. For example, when the front of the portable device 100 is upward, gravitational acceleration may be a positive (+) direction, and when the rear of the electronic device 100 is upward, gravitational acceleration may be a negative (−) direction.

At least one sensor included in the sensor unit 170 may be implemented with an additional chip, or one chip may be implemented with a plurality of sensors (e.g., a 6-axis sensor including a geomagnetic sensor and an acceleration sensor or a 9-axis sensor including a geomagnetic sensor, an acceleration sensor, and a gyro sensor).

One sensor or one chip included in the sensor unit 170 detects a state of the portable device 100 and transmits a signal corresponding to the detected state to the control unit. Those skilled in the art may easily understand that sensors in the sensor unit 170 may be added or removed according to the performance of the portable device 100.

The storage unit 175 stores signals or data inputted/outputted corresponding to operations of the mobile communication unit 120, the sub communication unit 130, the multimedia unit 140, the camera unit 150, the GPS unit 155, the input/output unit 160, the sensor unit 170, and the touch screen 190, in response to a control of the control unit. The storage unit 175 stores a GUI (relating to a control program for controlling the portable device 100 or the control unit, or an application provided from a manufacturer or downloaded from the outside), images for providing the GUI, user information, documents, databases, or related data.

In an embodiment of the present invention, the term "storage unit" includes a ROM 112 and a ROM 113 in the control unit or a memory card such as a micro SD card and a memory stick mounted on the portable device 100. The storage unit may include nonvolatile memory, volatile memory, hard disk drive (HDD), or solid state drive (SSD).

The storage unit may store a directional layer, a command displayed on the directional layer, a command list, notification, an approval icon, a rejection icon, an object, an application screen, content displayed on an application screen, screen data, or various sub screens.

The storage unit may store a critical magnetism intensity and magnetism information received from a sensor unit (e.g., a magnetic intensity in each axis direction, a change in magnetic intensity in each axis direction which is received from a sensor unit, an approaching direction of an external device which is calculated using the received magnetic intensity, or an approaching direction of an external device calculated using a magnetic intensity). The storage unit may store a slope of a portable device received from a sensor unit or an angle of a portable device calculated by using a received slope.

The storage unit may store magnetism information received from a sensor unit of an external device or a sensor unit of another external device (e.g., a magnetic intensity in each axis direction, a change in magnetic intensity in each axis direction which is received from a sensor unit, an approaching direction of an external device which is calculated using the received magnetic intensity, or an approaching direction of an external device calculated using a magnetic intensity). The storage unit may store a slope of a portable device received from a sensor unit of an external device or an angle of a portable device calculated by using a received slope.

The storage unit may store the color of a directional layer, a geometrical figure corresponding to a directional layer, a portion of a geometrical figure, a sub directional layer corresponding to a directional layer, the color of a sub directional layer, a portion of a sub directional layer, a second sub directional layer corresponding to a directional layer, the color of a second sub directional layer, or a portion of a second sub directional layer.

The storage unit may temporarily or permanently store image information of an image file. The storage unit may store a control signal corresponding to file transmission progression.

The storage unit may store touch information (e.g., the X and Y coordinates of a detected touch position and a touch detection time) corresponding to a touch and/or touch continuous movement detected from the directional layer, or hovering information (e.g., the X, Y, and Z coordinates of hovering and a hovering time) corresponding to the hovering detected from the directional layer. The storage unit may store a type of touch continuous movement (e.g., flick or drag).

The storage unit may store a visual feedback (e.g., a video source) that a user can recognize, an auditory feedback (e.g., a sound source) that a user can recognize outputted from the speaker 163, and a haptic feedback (e.g., a haptic pattern) that a user can recognize outputted from the vibration motor 164, in correspondence to a touch or touch gesture detected from the directional layer 510.

The storage unit may store a visual feedback (e.g., a video source) that a user can recognize outputted on the touch screen 190 and an auditory feedback (e.g., a sound source) that a user can recognize outputted from the speaker 163, in correspondence to a content transmission progression displayed on the directional layer or a transmitted content.

The power supply unit 180 may supply power to at least one battery in the portable device 100 in response to a control of the control unit. At least one battery may be disposed between the touch screen 190 at the front 100*a* and the rear 100*c*. Additionally, the power supply unit 180 may supply power inputted from an external power source to the portable device 100 through a wired cable connected to the connector 165, in response to a control of the control unit.

The touch screen 190 may provide a GUI corresponding to various services (e.g., a call, data transmission, broadcast, photo shooting, video, or application) to a user. The touch screen 190 transmits an analog signal corresponding to a single or multi touch inputted through the GUI, to a touch screen controller 195. The touch screen 190 may receive a single or multi touch through the user's body (e.g., fingers) or through input unit 167.

In an embodiment of the present invention, the touch is not limited to a contact between the touch screen 190 or the user's body or a contact of through input unit 167, and may include non-contact (e.g., a hovering whose detectable interval between the touch screen 190 and the user's body or the input unit 167 is less than about 20 mm). Those skilled in the art may easily understand that a detectable non-contact interval may vary according to the performance or structure of the portable device 100.

The touch screen 190 may be implemented with a resistive type, a capacitive type, an infrared type, an acoustic wave type, or an electromagnetic resonance type.

The touch screen controller 195 converts an analog signal corresponding to a single or multi touch received from the touch screen 190 into a digital signal (e.g., the X and Y coordinates corresponding to a detected touch position) and transmits the converted digital signal to the control unit. The control unit calculates the X and Y coordinates corresponding to a touch position on the touch screen 190 by using the digital signal received from the touch screen controller 195. Additionally, the control unit controls the touch screen 190 by using the digital signal received from the touch screen controller 195. For example, the control unit displays the selected shortcut icon 191*f* of FIG. 2 displayed on the touch screen 190 to be distinguished from other shortcut icons (e.g., 191*a* to 191*d*), or may execute and display an application (e.g., a smart school) corresponding to the selected shortcut icon 191*f*, in response to an inputted touch.

At least one touch screen controller 195 may control at least one touch screen 190, or at least one touch screen controller 195 may control a plurality of hinge connectible or flexibly connectible touch screens (e.g., the touch screen 190 and other not shown touch screens). The touch screen controller 195 may be included in the control unit corresponding to the performance or structure of the portable device 100. FIG. 2 is a front perspective view illustrating a portable device according to an embodiment of the present invention, and FIG. 3 is a rear perspective view illustrating a portable device according to an embodiment of the present invention.

Referring to FIGS. 1 and 3, the touch screen 190 is positioned at the center of the front 100*a* of the portable device 100. Referring to FIG. 2, when a user logs in the portable device 100, a home screen 191 is displayed on the touch screen 190. The portable device 100 may have a plurality of different home screens. The home screen 191 may display shortcut icons 191*a* to 191*i* corresponding to applications selectable by a user, a weather widget 191*j* and a clock widget 191*k*. The weather widget 191*j* and the clock widget 191*k* may be displayed as one widget. A status bar 192 for displaying a status of the portable device 100 such as a battery charging status, the intensity of a received signal, and a current time may be displayed on the top of the home screen 191.

A first camera 151, a speaker 163*a* and a proximity sensor 171 may be positioned at the top of the front 100*a* of the portable device 100. A second camera 152, a flash 153, and a speaker 163*b* may be positioned at the rear 100*c* of the portable device 100.

A home button 161*a*, a menu button 161*b*, and a back button 161*c* may be positioned at the bottom of the front 100*a* of the portable device 100. The button 161 may be implemented with a touch button instead of a physical button. Additionally, the button 161 and the home screen may be displayed on the touch screen 190 simultaneously.

A power/lock button 161*d*, a volume button 161*e*, and at least one mike 162 may be positioned at the side 100*b* of the portable device 100. A connector 165 is formed at the bottom side of the portable device 100. The connector 165 may be connected to an external device through a wire. Moreover, an insertion hole into which the input unit 167 having the button 167*a* is inserted may be positioned at the bottom side of the portable device 100. The input unit 167 may be stored in the portable device 100 through the insertion hole, and may be drawn from the portable device 100 when used.

Figure 4:
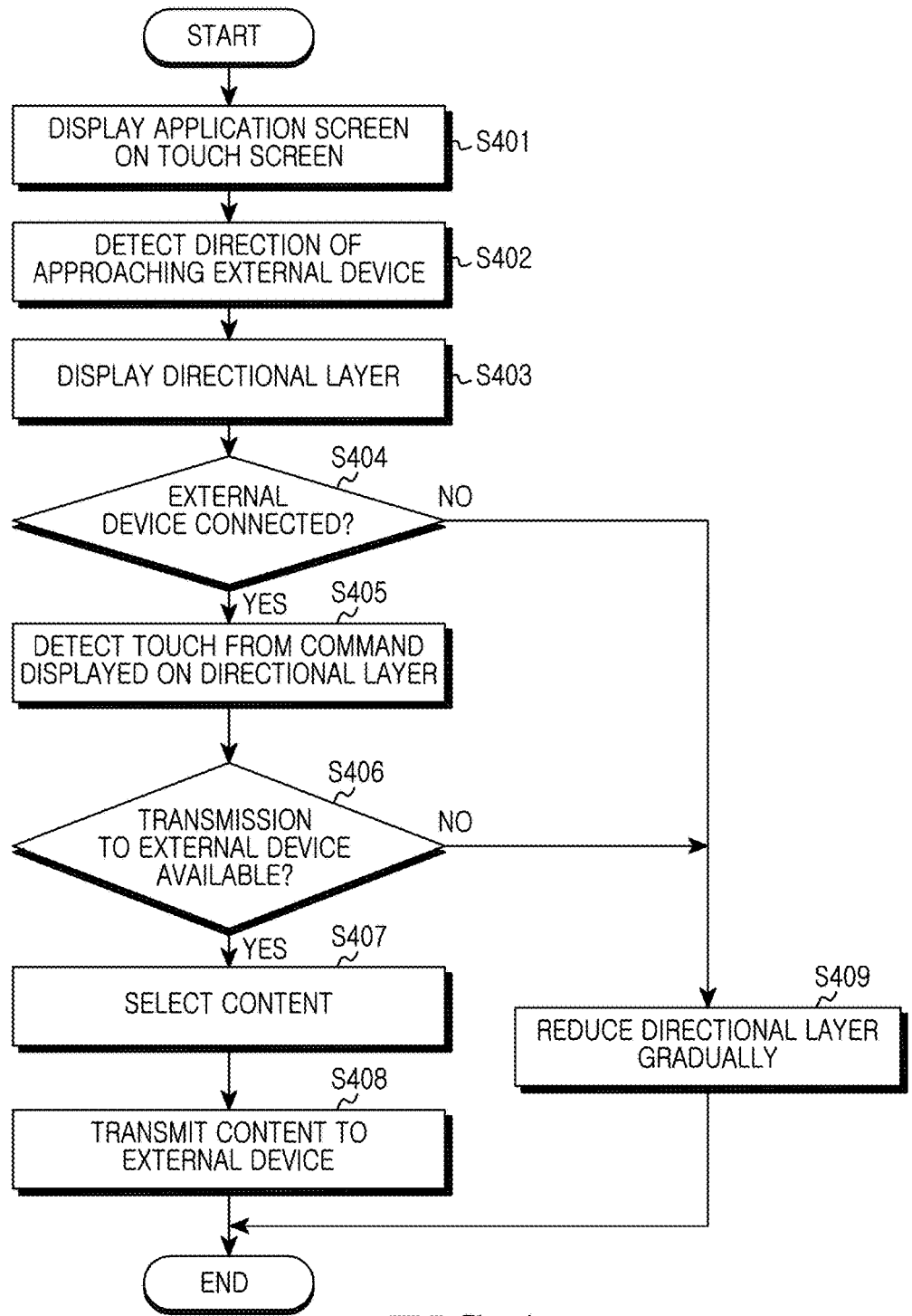
FIG. 4 is a flowchart illustrating a screen displaying method of a portable device according to an embodiment of the present invention.

FIG. 4 is a flowchart illustrating a screen displaying method of a portable device according to an embodiment of the present invention, and FIGS. 5 to 10 are views illustrating a screen displaying method of a portable device according to an embodiment of the present invention.

In step S401 of FIG. 4, a touch screen displays the screen of an application.

Figure 5B:
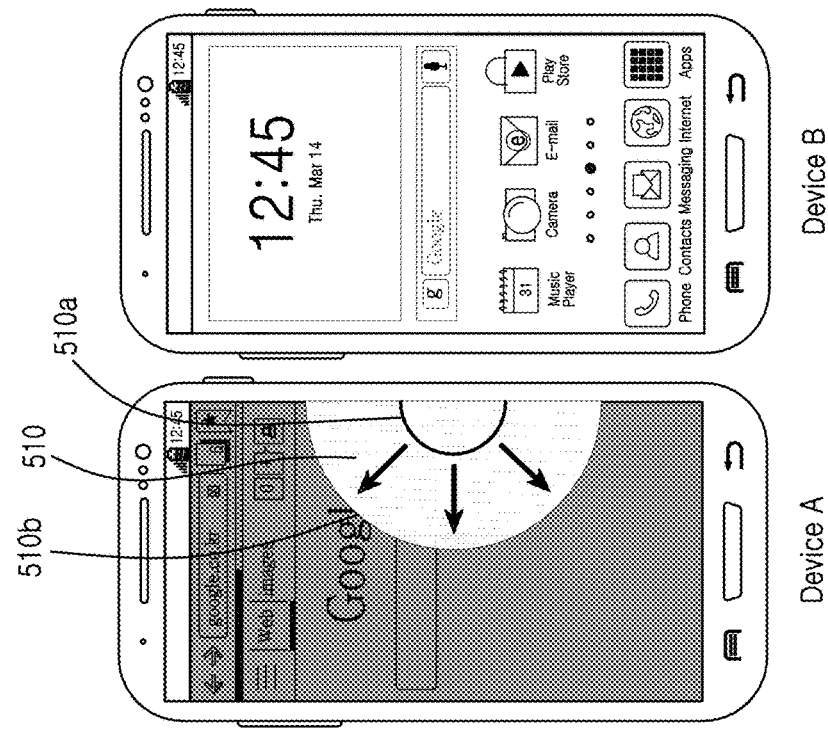
FIGS. 5A and 5B are views illustrating a screen displaying method of a portable device according to an embodiment of the present invention.
Figure 5A:
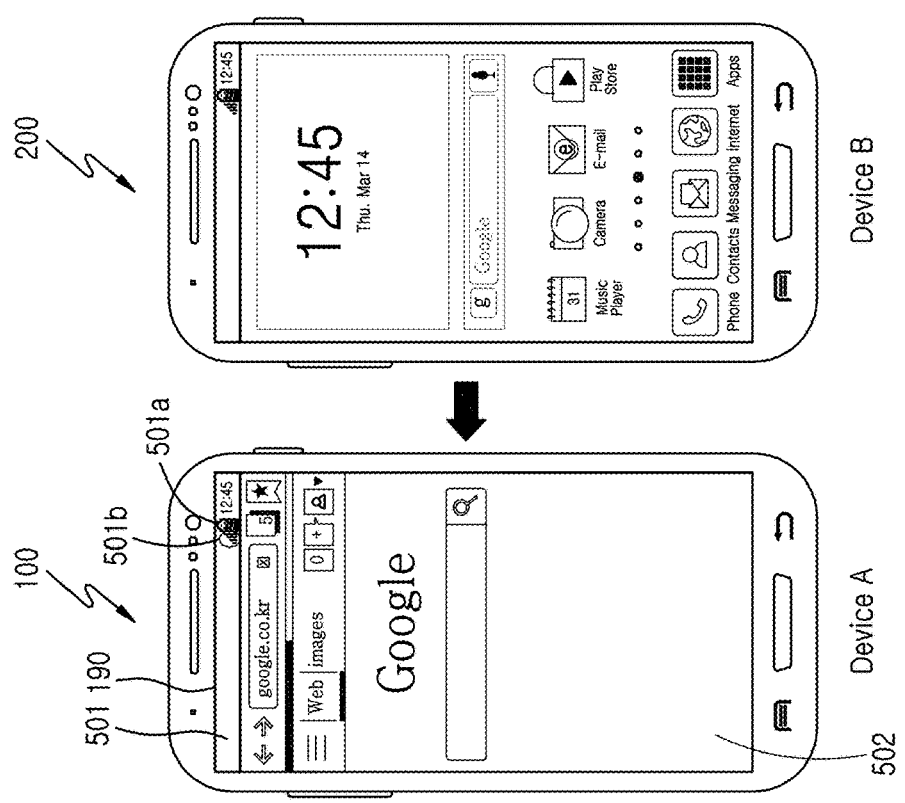

Referring to FIG. 5A, the touch screen 190 displays a status bar 501 and an application screen 502. The status bar 501 displays a status of the portable device A 100 such as a charging status icon 501*a* of a battery, a reception signal intensity icon 501*b*, or a vibration mode icon (not shown). The application screen 502 may display an Internet shortcut icon 191*d* of the FIG. 2, i.e., one of the shortcut icons in the home screen 191 of the FIG. 2, selected by a user or an input unit.

The status bar 501 may not be displayed on the touch screen 190 according to the OS or application of the portable device 100. When the status bar 501 is not displayed, only the application screen 502 may be displayed on the touch screen 190.

Referring to FIG. 2, an executable application of the portable device 100 includes a call 191*a*, a contact 191*b*, a message 191*c*, a web browser 191*d*, an audio player 191*f*, a camera application 191*g*, an e-mail application 191*h*, as well as other applications not shown in FIG. 2, including a gallery application, a video player, a messenger application, or a Social Networking Service application. An application executable in the portable device 100 may include an application provided from the manufacturer or telecommunication of the portable device, a widget, or an application downloaded from an online market.

According to another embodiment of the present invention, a home screen may be displayed on a touch screen. In step S401 of FIG. 4, the home screen 191 and the status bar 501 may be displayed on the touch screen 190, instead of the application screen 502.

In step S402 of FIG. 4, a direction of an approaching external device is detected.

Figures 6A, 6B:
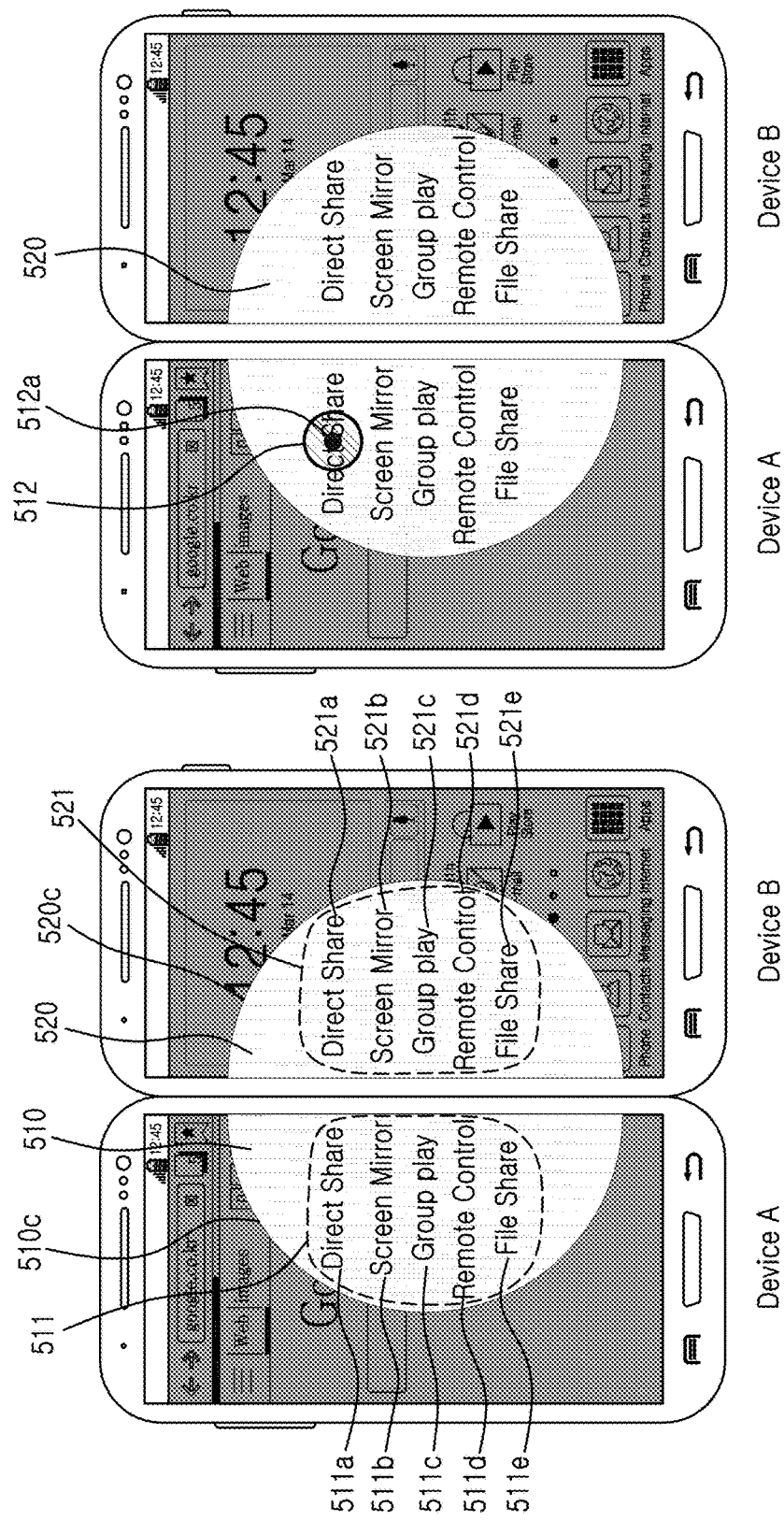
FIGS. 6A and 6B are views illustrating a screen displaying method of a portable device according to an embodiment of the present invention.

Referring to FIG. 5A and FIG. 6B, the control unit may detect an external device (e.g., a device B 200) approaching from the right of a portable device (e.g., a device A 100) through the sensor unit 170.

The control unit calculates magnetic information corresponding to the external device 200 having magnetism around it during a period (e.g., about 10 msec) determined through the geomagnetic sensor 172 of the sensor unit 170. The magnetic information may include a magnetic force intensity, a magnetic force direction, a change in magnetic force intensity, a magnetic field intensity, and a change in magnetic field intensity of the external device B 200. Additionally, the magnetic information may include a magnetic value detected from one axis (e.g., one of X, Y, and Z axes) or a magnetic vector sum detected from a plurality of axes (e.g., one of XY, XZ, YZ, and XYZ axes).

The control unit detects an approach of the external device B 200 having a magnetic substance by using the calculated magnetic information. The magnetic intensity detected from the geomagnetic sensor 172 may vary depending on a distance between the portable device 100 and the external device B 200. For example, a short distance (e.g., less than about 20 cm) and a long distance (e.g., more than about 1 m) may have a different magnetic intensity. Additionally, the magnetic intensity detected from the geomagnetic sensor 172 may vary depending on a direction of the portable device A 100 and the external device B 200. For example, when the position of the geomagnetic sensor 172 in the portable device 100 faces or does not face the position of a magnetic substance (not shown) in the external device B 200, the intensity of detected magnetism may vary. Additionally, the magnetic intensity detected from the geomagnetic sensor 172 may vary depending on the size of a magnetic substance in the external device 200. For example, the magnetic intensity detected from a magnetic substance in a 5 inch 70 W output speaker may be different from that detected from a magnetic substance in a 2 inch 20 W output speaker.

The geomagnetic sensor 172 is a 3-axis geomagnetic sensor, and the control unit performs a vector operation on the magnetism detected from the X, Y, and Z axes by using the geomagnetic sensor to calculate the magnetic intensity. For example, the intensity of magnetism may be calculated using a general formula such as |x|, y, |z|, $\sqrt{x^2+y^2}$, $\sqrt{x^2+z^2}$, $\sqrt{y^2+z^2}$, $\sqrt{x^2+y^2+z^2}$ or other mathematical methods.

Referring to FIG. 5A, when a distance between the portable device A 100 and the external device B 200 is more than about 50 cm, the magnetic intensity detected through the geomagnetic sensor 172 may be about 40 µT to about 60 µT. Referring to FIG. 5B, when a distance between the portable device A 100 and the external device B 200 is about 10 cm to about 20 cm, the magnetic intensity detected through the geomagnetic sensor 172 may be about 130 µT to about 160 µT.

Referring to FIG. 6A, when there is almost no space between the portable device A 100 and the external device B 200 (e.g., the distance≤2 mm), the magnetic intensity detected through the geomagnetic sensor 172 may be more than about 2000 µT. Here, a critical magnetic intensity is defined (e.g., about 150 µT). The control unit may continuously calculate the magnetic intensity detected from the geomagnetic sensor 172 corresponding to an approach of the external device B 200. When the magnetic intensity detected from the geomagnetic sensor 172 corresponding to an approach of an external device is more than about 150 µT, the control unit determines whether to display a directional layer on the touch screen 190 by using a critical magnetic intensity stored in a storage unit. Those skilled in the art may easily understand that the critical magnetic intensity is determined by a user input in the OS, a manufacturer input, or download from server.

Referring to FIG. 6B, when a distance between the portable device A 100 and the external device B 200 is less than about 10 cm, the magnetic intensity detected through the geomagnetic sensor 172 may be more than about 170 µT. Those skilled in the art may easily understand that using a magnetic intensity according to a distance between the portable device A 100 and the external device B 200 is merely one embodiment, and the present invention is not limited thereto.

The control unit calculates a magnetic direction through a typical trigonometrical function on the magnetism detected from X, Y, and Z axes by using the geomagnetic sensor 172. The control unit calculates a direction from an X-axis to a Y-axis (e.g., an angle) and a direction from an X-axis to a Z-axis (e.g., an angle). For example, the angle of a magnetic direction may be calculated by using two formulas on a direction from an X-axis to a Y-axis.

$$\theta_{xy1} = \cos^{-1} \frac{x}{\sqrt{x^2+y^2}} \quad (1)$$

$$\theta_{xy2} = \sin^{-1} \frac{y}{\sqrt{x^2+y^2}} \quad (2)$$

$$\theta_{xy} = \tan^{-1} \frac{z}{\sqrt{x^2+y^2}} \quad (3)$$

In the case of Equation (1), since 90° and 270° are the same due to the characteristic of the cosine function, correction is made by using Equation (2). When a Y-axis angle is 0°≤θxy1≤180° on an X-axis, calculation is made by using only Equation (1). Then, a direction from the X-axis to the Z-axis (e.g., −90°≤θxy≤90° may be calculated by using arc tangent Equation (3). Additionally, the control unit calculates a magnetic direction by using magnetic intensity (e.g., |x|, |y|, |z|). For example, one direction of the 3-axes may be measured by using a magnetic direction as an axis direction in which the largest magnetic intensity calculated among X, Y, and Z axes is predicted as a magnetic direction.

In addition to an approach direction of the external device B 200, the control unit calculates the slope of the portable device A 100 by performing a calculation on the slope detected from the X, Y, and Z axes through the gyro sensor 173 measuring the rotary inertia of the portable device A 100. Moreover, the control unit calculates the slope of the portable device A 100 by performing a calculation on the slope detected from the X, Y, and Z axes through an acceleration sensor.

Figures 16A, 16B:
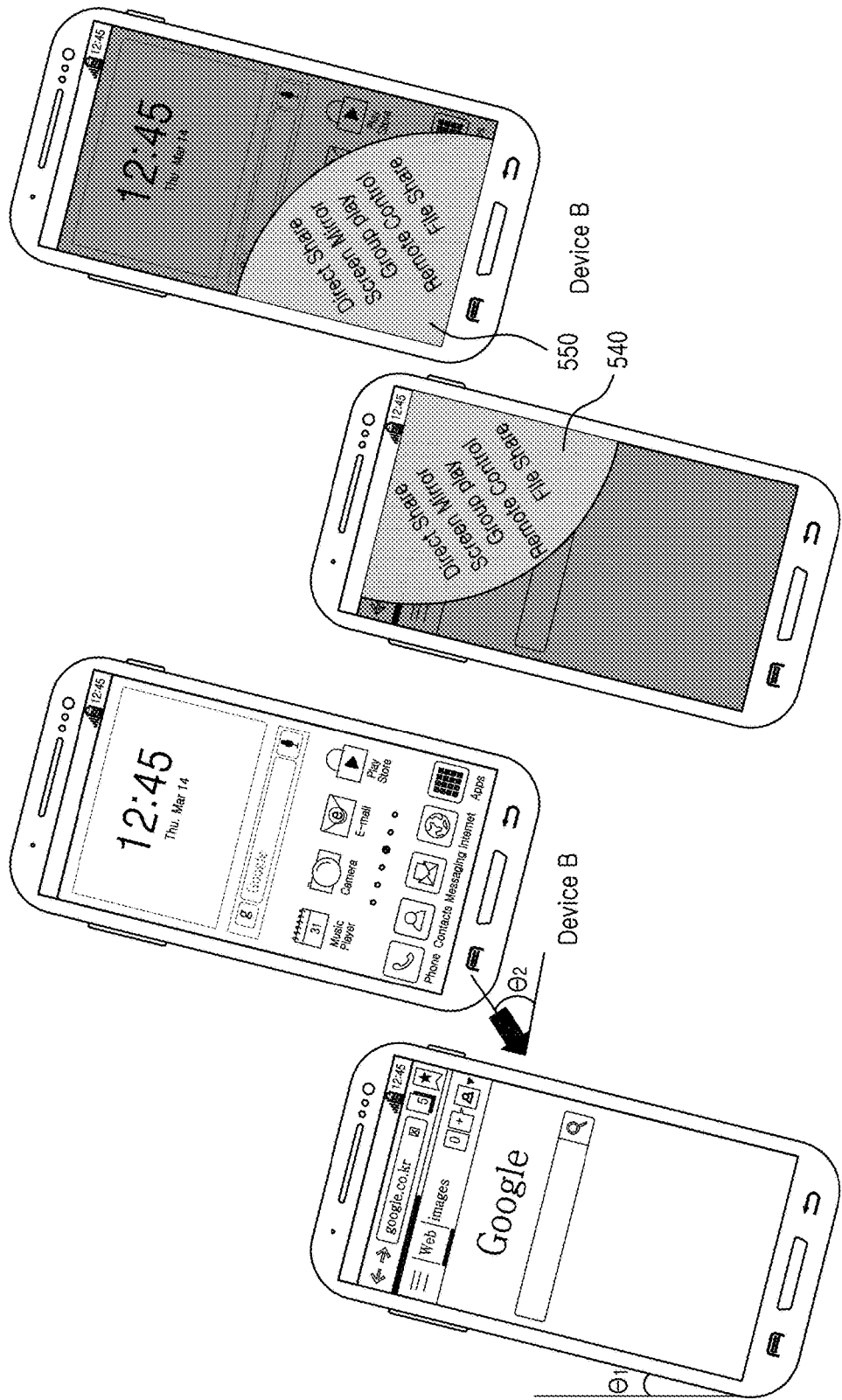
FIGS. 16A and 16B are views illustrating a screen displaying method of a portable device according to another embodiment of the present invention.

FIGS. 16A and 16B are views illustrating a screen displaying method of a portable device according to another embodiment of the present invention.

Referring to FIG. 16A and FIG. 16B, the control unit calculates a direction of an approaching external device B 200 by adding an angle calculated by using the sensor unit 170 such as the gyro sensor 173 or an acceleration sensor. For example, the control unit calculates a direction of the external device B 200 (e.g., θ2=about 45° by adding an angle of the portable device A 100 (e.g., θ1=about 25°). Finally, the portable device A 100 may calculate a direction of the external device B 200 approaching at about 70°.

Referring back to FIG. 4, in step S402, when the home screen 191 and the status bar 501 are displayed on the touch screen 190, the control unit detects an approaching direction of the external device B 200. Since the calculation of an approaching direction of the external device B 200 in the home screen 191 is substantially identical to step S402 of FIG. 4, redundant description is omitted.

In step S403 of FIG. 4, a directional layer is displayed.

Referring to FIG. 5B to FIG. 7B, the control unit overlaps the directional layer 510 corresponding to an approaching direction of the external device B 200 approaching from the right, on the application screen 520, and then may display it. The directional layer 510 may be displayed for content sharing with the approaching external device B 200. The directional layer 510 may be separated from the application screen 502. The control unit displays the directional layer 510 stored in a storage unit on the basis of the magnetism information and critical magnetic intensity calculated using the geomagnetic sensor 172. The control unit may execute an additional application displaying a directional layer stored in a storage unit, on the basis of the calculated magnetism information and magnetic intensity, or the control unit may display a directional layer stored in the storage unit on the basis of the magnetism information and magnetic intensity calculated through preferences set in the OS.

The control unit may dim the application screen 502 in order to distinguish it from the displayed directional layer 510. The degree of dim of the application screen 502 is sufficient when the application screen 502 is distinguished from the directional layer 510.

As the approaching external device B 200 becomes closer (e.g., the detected magnetic intensity is greater than or equal to a critical magnetic intensity), the control unit may increase and display the area of the directional layer 510. As the external device B 200 becomes closer, the control unit increases the area of the displayed directional layer 510 gradually (e.g., 510*a*→510*b*→510*c*). Although the gradual increase of the direction layer is divided into three steps according to an embodiment of the present invention, it is apparent to those skilled in the art that the gradual increase may be divided into any number of steps.

The control unit increases the area of the directional layer 510 corresponding to an approaching direction of the external device B 200 gradually, from four sides of the touch screen 100 (e.g., the top side, the bottom side, the left side, and the right side) and also four vertices where two edges meet (e.g., the left top edge, the left bottom edge, the right top edge, and the right bottom edge). For example, referring to FIG. 5B, the directional layer 510 of the right side direction may be displayed gradually from two points between below a current time of the status bar 501 of the touch screen 190 and above the right bottom edge.

Referring to FIG. 16A and FIG. 16B, although an approaching direction of the external device 200 is calculated as about 70°, the control unit may gradually display the directional layer 510 of the right top edge direction from two points between below the status bar 501 of the touch screen 190 and the right side. In the case of FIG. 16A and FIG. 16B, the external device B 200 approaches the portable device A 100 on a table. Unlike this, when the external device B 200 approaches the portable device A 100 in an actual 3-D space, it is apparent to those skilled in the art that the direction layer 540 and the sub directional layer 550 may be changed according to an angle of the portable device A 100 and an approaching direction of the external device B 200.

The control unit may gradually display the directional layer 510 of the right top edge direction to correspond to the calculated slope of the portable device A 100 (e.g., about 25°) and the calculated approaching direction of the external device B 200 (e.g., about 45°).

The area of the displayed directional layer 510 may be determined by at least one of an interval or distance between the portable device A 100 and the external device B 200, magnetism information, and the intensity of the magnetic substance. The directional layer 510*c* having the broadest area in the displayable directional layer 510 may be displayed when there is almost no distance between the portable device A 100 and the external device B 200 (e.g., the interval≤2 mm). Additionally, the directional layer 510*c* having the broadest area in the displayable directional layer 510 may be displayed when a magnetic intensity between the portable device 100 and the external device 200 is the largest (e.g., the magnetic intensity≥200 µT). The area of the directional layer 510*c* having the largest magnetic intensity in the displayable directional layer 510 may be displayed when the magnetic size of a magnetic substance in the external device 200 is large (e.g., a 5 inch 70 W speaker).

The control unit may display the displayable directional layer 510 as a portion of a geometrical figure. The geometrical figure may be a 2-D figure (e.g., a plane figure) or 3-D figure (e.g., a stereo figure) displayable on the touch screen 190, for example. The geometric figure may include squares, rectangles, polygons, cubes, octahedrons, rhombuses, triangles, isosceles triangles, pyramids, triangular prisms, circles, ellipses, spheres, cones, cylinder, stars, water drops, etc. For example, when the geometric figure is a circle, the control unit may display a ½ circle (i.e., a semicircle) at one side area of the portable device A 100. The control unit may display a ¼ circle (i.e., a quadrant) at an edge area. Additionally, in order to display a geometric figure (e.g., a circle, a ½ circle, and a ¼ circle), the control unit may display the diameter of a displayed circle to be smaller than the length of one side.

The control unit may display a portion of a geometric figure corresponding to the directional layer 510 on each of the portable device A 100 and the external device B 200. A remaining portion of a geometric figure corresponding to the directional layer 510 displayed on the external device B 200 is defined as a sub directional layer. The sub directional layer 520 may be a portion of a geometric figure displayed to face a portion of a geometric figure displayed on the directional layer 510. By displaying the directional layer 510 and the sub directional layer 520 facing the directional layer 510, a full geometric figure may be formed.

Referring to FIG. 5B and FIG. 6B, in correspondence to one portion (e.g., a semicircle) displayed on the portable device 100 gradually, similarly, the control unit may display one portion (e.g., a facing semicircle) of a geometric figure on the external device B 200. Since the display of the sub directional layer 520 of the external device B 200 is substantially identical to the display of the directional layer 510 of the portable device A 100, a redundant description is omitted.

Those skilled in the art may easily understand that whether to gradually display a geometric figure on the external device B 200 is determined by a user input in the OS, a manufacturer input, or download from server.

Referring back to FIG. 4, in step S403, when the home screen 191 and the status bar 501 are displayed on the touch screen 190, the control unit may overlap a directional layer corresponding to an approaching direction of the external device B 200 on the home screen 191, and display it.

In step S404 of FIG. 4, the control unit determines whether an external device is connected.

In correspondence to an approach of the external device B 200, the control unit establishes wireless connection with the external device B 200 through the mobile communication unit 120 or the sub communication unit 130. The control unit may establish wireless connection with the external device B 200 through the wireless LAN unit 131 or the short distance communication unit 132 corresponding to an approach of the external device B 200.

The control unit searches for the external device B 200 by using the device information (e.g., the identification information such as the SSID of the external device B 200, current state information, and capability information) of the external device B 200 received from the external device B 200 through a communication unit. Unlike a general identifier pattern such as an Internet router, the identification information of the external device B 200 may use a predetermined pattern or a predetermined sequence, or a predetermined value or a combination thereof. When the external device B 200 uses additional identification information, the control unit requires a preparation procedure for a situation in which a connection of the external device B 200 is requested or a communication service is requested according to an embodiment of the present invention.

The external device B 200 uses typical device information and also uses the header or payload of an advertising packet including the device information, so as to notify information of the identifier of communication service corresponding to an approach of the external device B 200 to the portable device A 100, or an event such as a requested communication procedure.

The control unit may become a master device to advertise the device information of the portable device as the role of an access point, and the external device B 200 receiving the device information of the portable device A 100 becomes a slave device to perform a communication connection procedure. In this case, the control unit may determine a time at which the device information of the portable device is advertised through a random back-off. Since the control unit searches for the device information of the external device B 200 right before advertising the device information of the portable device A 100, it may prevent a collision caused by advertising the device information of a neighboring external device. It is apparent to those skilled in the art that a wireless connection between the portable device A 100 and the approaching external device B 200 is not limited to the wireless LAN unit 131 or the short distance communication unit 132.

The control unit calculates the intensity (Received Signal Strength Indication (RSSI)) of a signal received from the external device B 200 through a communication unit.

The control unit may display a direction layer corresponding to the calculated reception signal intensity of the external device B 200. For example, the control unit displays the directional layer 510 corresponding to the calculated magnetism information, overlaps a directional layer corresponding to a reception signal intensity on the directional layer 510, and displays it. In one case, the control unit displays the directional layer 510 corresponding to the calculated magnetism information dimly, overlaps a directional layer corresponding to a reception signal intensity on the dimmed directional layer 510, and displays it. In another case, the control unit displays the directional layer 510 corresponding to the calculated magnetism information with a first color (e.g., green), overlaps a directional layer corresponding to a reception signal intensity on the directional layer 510 with a second color (e.g., blue), and displays it. In a further case, the control unit displays the directional layer 510 corresponding to the calculated magnetism information with a first color (e.g., colorlessness), overlaps a directional layer corresponding to a reception signal intensity on the directional layer 510 with a second color (e.g., blue), and displays it.

When the directional layer 510 corresponding to magnetism information overlaps a direction layer corresponding to a reception signal intensity and they are displayed, the control unit may change the directional layer 510 according to the reception signal intensity. For example, the area of a directional layer corresponding to a reception signal intensity may be broader than the area of the directional layer 510.

Referring to FIG. 6A to FIG. 6B, when the portable device A 100 and the external device B 200 approach each other (e.g., when an interval or distance between the portable device A 100 and the external device B 200 is ≤2 mm), the control unit may display the directional layer 510c on the touch screen 190. Additionally, when the portable device A 100 and the external device B 200 are connected to each other wirelessly, the control unit displays the directional layer 510c on the touch screen 190 of the portable device A 100, and also controls the external device B 200 to display the sub directional layer 520c corresponding to the directional layer 510c on the touch screen of the external device 200.

The control unit may transmit various control signals for sub directional layer display (e.g., including a gradual display of a sub directional layer) and command list display on a sub directional layer, to the external device B 200 through a communication unit. For example, the control unit may transmit a control signal for sub directional layer display to the external device B 200 through a communication unit so as to display a sub directional layer on the external device B 200. The external device B 200 may store in a storage unit various control signals for sub directional layer display (e.g., including a gradual display of a sub directional layer) and command list display on a sub directional layer, which are received from the portable device A 100 through a communication unit. As the directional layer 510 and the sub directional layer 520 are displayed, the portable device A 100 and the external device B 200 may share (e.g., transmit) content stored in a storage unit or displayed bi-directionally in addition to one direction.

When an interval or distance between the portable device A 100 and the external device B 200 is close (e.g., the interval 2 mm), the control unit of the external device B 200 may display the sub directional layer 520c on the touch screen of the external device B 200 in response to the received control signal.

The displayed directional layer 510 may include a command list 511 for content sharing. The command list 511 may include a direct share 511a, a screen mirror 511b, a group play 511c, a remote control 511d, and a file share 511e. The displayed sub directional layer 520 may include a command list 521 for content sharing. The command list 521 may include a direct share 521a, a screen mirror 521b, a group play 521c, a remote control 521d, and a file share 521e.

The commands 511a to 511e and 521a to 521e in the displayed command lists 511 and 521 may activate only executable commands on the basis of the device information (e.g., referring to support information) of the external device B 200 pre-stored on a storage unit connected to the portable device A 100. For example, if the remote controls 511d and 521d displayed on the command lists 511 and 521 are a function or service that the portable device A 100 and the external device B 200 do not support, the control unit may display the remote controls 511d and 521d dimly. The dimly displayed remote controls 511d and 521d cannot be selected (e.g., touched) by a user. The control unit may transmit a control signal corresponding to an executable command display to the external device B 200 through a communication unit. The control unit of the external device B 200 divides the commands into executable commands and unexecutable commands in response to the received control signal, and then displays them on the sub directional layer 520c.

Those skilled in the art may easily understand that the displayed command lists 511 and 521 may be added, deleted or modified according to a content sharing method or service between the portable device A 100 and the external device B 200.

Those skilled in the art may easily understand that the directional layer in step S403 of FIG. 4 is connected to the external device in step S404 of FIG. 4 and displayed. When it is determined that an external device is connected in step S404 of FIG. 4, the control unit proceeds to step S405, where a touch is detected from the commands displayed on the directional layer.

Referring to FIG. 6B, a touch 512 inputted by a user is detected from a command (e.g., the direct share 511a) of the command list 511. The control unit detects a touch from the command 511 through the touch screen 190 and the touch screen controller. The control unit receives position information (e.g., X1 and Y1 coordinates corresponding to a touch point 512a) corresponding to the touch 512 from the touch screen controller.

The control unit may store in a storage unit a touch on the touch screen 190 in the received second position information, a touch detection time (e.g., 12:45), and touch information (e.g., a touch duration time and a touch pressure) corresponding to the touch. The touch 512 detected from the command list 511 may be generated by one of the user's fingers or through the touch input unit 167. In step S405 of FIG. 4, a touch is detected from the command 512*a* of the command list 511, but is not limited thereto. According to another embodiment of the present invention, a touch may be detected from the commands 521*b* to 521*e* displayed on the command list 521. When a touch is detected from the external device B 200, content may be transmitted in an opposite direction to where the touch 512 is detected from the portable device A 100.

In step S406 of FIG. 4, it is confirmed whether transmission to the external device B 200 is available.

The control unit determines whether the content transmission to the external device B 200 is available in response to the touch 512 detected from the command 511*a*. The control unit may determine whether content direct share is available in response to the touch 512 on the basis of the device information of the connected external device B 200. Additionally, the control unit may transmit a request on whether content direct share is available to the external device B 200 through a communication unit in response to the touch 512. The control unit may determine whether content direct share is available by receiving a reply corresponding to the direct share from the external device B 200 through a communication unit.

The control unit of the portable device A 100 or the external device B 200 may display an additional notification message corresponding to the reply on the portable device A 100 or the external device B 200.

In step S407 of FIG. 4, content is selected.

The control unit selects content for direct share with the external device B 200 in response to the touch 512 for the command 511*a*. A content for transmission target may include at least one of screen data configuring an application screen displayable on a touch screen, screen data configuring an application screen displayable on the external device B 200, Uniform Resource Locator (URL) information executable on the external device B 200, image files, text files, audio files, video files, and android installation files (e.g., android packages). The screen data may include images, texts, audios, videos or hyperlinks, which configure a screen.

The selected content may vary according to the commands 511*a* to 511*e* displayed on the command list 511. For example, when the touch 512 is detected from the command 511*a*, the control unit may select the application screen 502 as transmission target content.

Figures 12A, 12B:
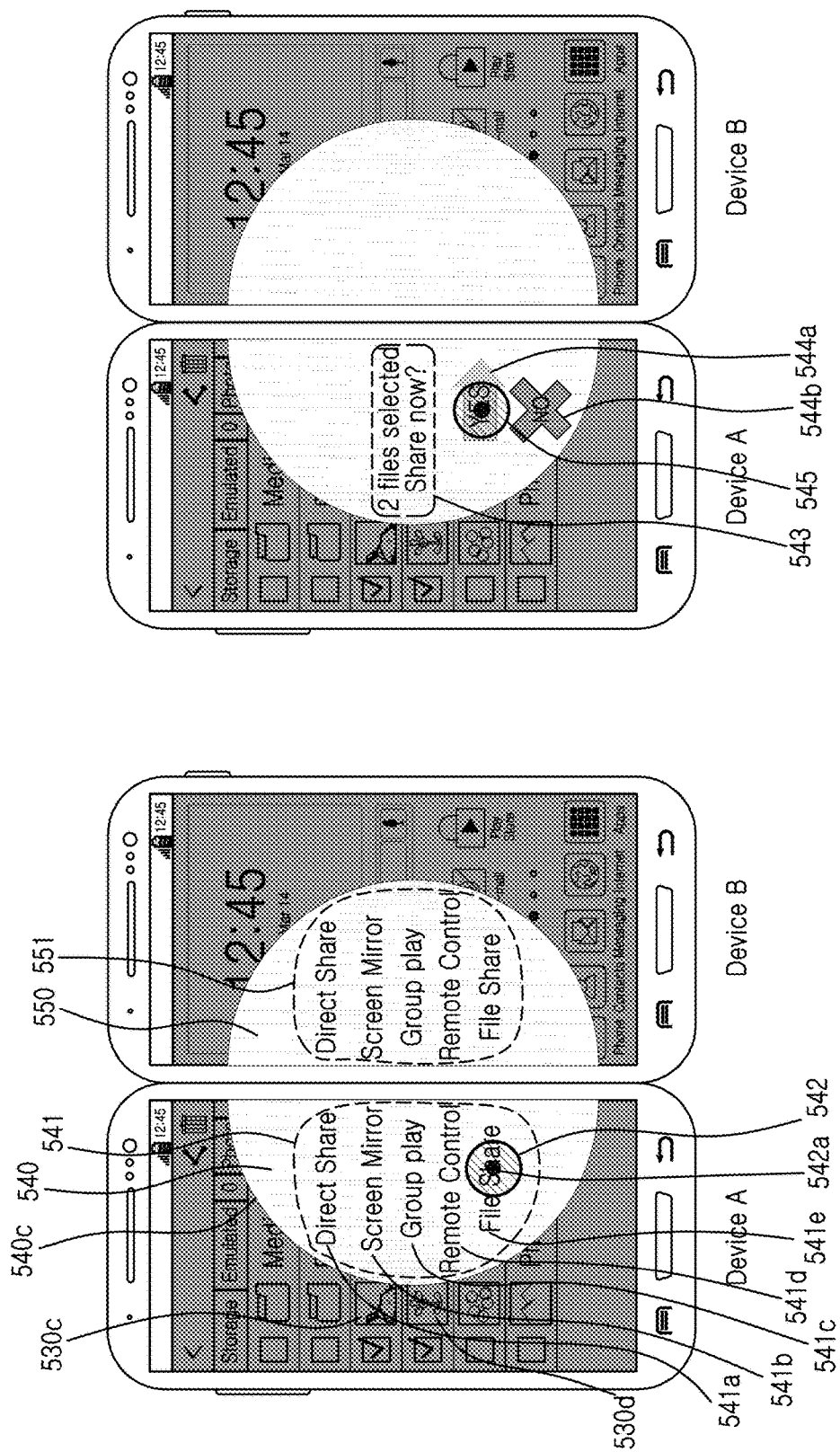
FIGS. 12A and 12B are views illustrating a screen displaying method of a portable device according to another embodiment of the present invention.

In FIG. 12A, when a touch 542 is detected from the command 541*e*, the control unit may select an image file as transmission target content. The control unit may change a geometric figure (e.g., from a circle to a star) corresponding to the directional layer 510 in response to the selected content. When the content is an image file, this will be described in more detail with reference to anther embodiment of the present invention below.

In step S408 of FIG. 4, the content is transmitted to the external device 200.

Figure 7A:
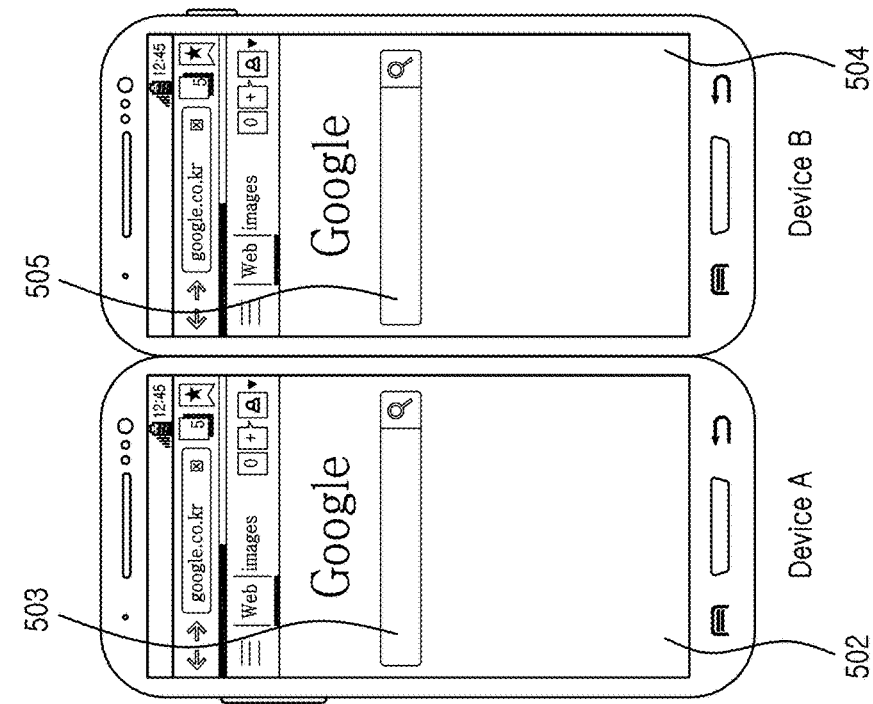
FIGS. 7A and 7B are views illustrating a screen displaying method of a portable device according to an embodiment of the present invention.
Figure 7B:
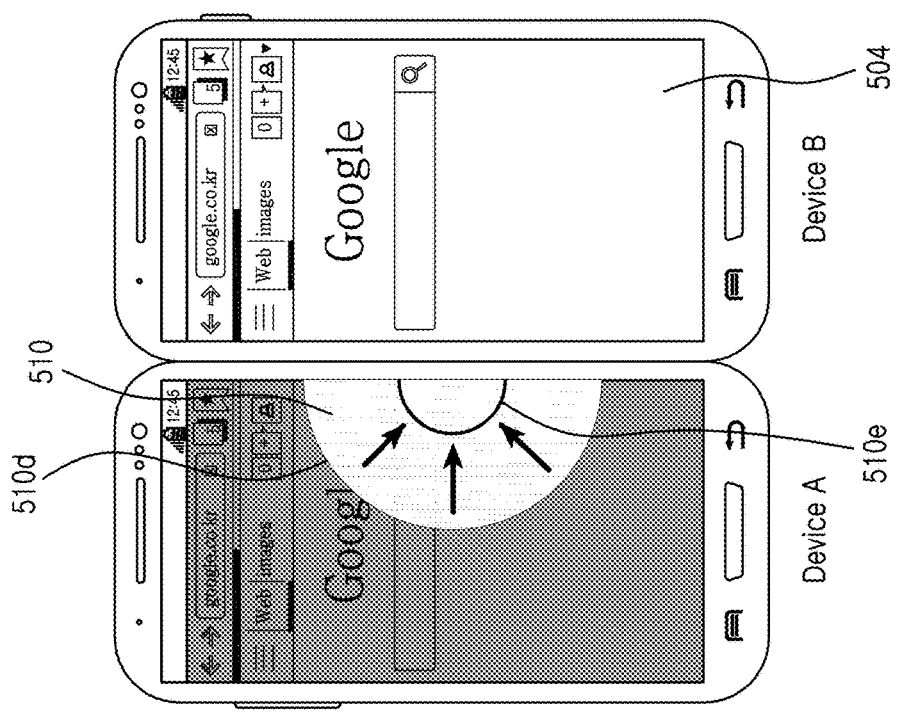

Referring to FIG. 7A and FIG. 7B, the application screen 502 of the portable device A 100 is direct-shared with the external device B 200 and displayed on a touch screen.

The control unit generates sharing information corresponding to the direct share of the application screen 502 and temporarily stores it in a storage unit. The generated sharing information may include a compatible application name displaying the application screen 502 on the external device B 200, an application type, a command automatically executing an application without an additional user input, or a URL (corresponding to a webpage when the application screen 502 is a webpage). The control unit may transmit the temporarily stored sharing information to the external device B 200 through a communication unit.

The control unit of the external device B 200 may store the sharing information received through a communication unit in a storage unit. The control unit of the external device B 200 may analyze and extract the stored sharing information. The control unit of the external device B 200 may select a corresponding application (e.g., a web browser) by using the extracted application name or type. The control unit of the external device B 200 may execute an application by using the extracted command. Moreover, the control unit of the external device B 200 may display an application screen (e.g., a webpage 504) corresponding to URL information, on the executed application by using the extracted URL information.

Since the application screens 502 and 504 are displayed by an additional application (e.g., a web browser) executed on the portable device A 100 and the external device B 200, they may operate independently. For example, the control unit of the portable device A 100 and the control unit of the external device B 200 may display search results corresponding to search keywords inputted differently into search windows 503 and 505 by a user, on the application screens 502 and 504, respectively.

As sharing information is transmitted completely, the control unit may reduce the area of the displayed directional layer 510 gradually (e.g., 510*c*→510*d*→510*e*) and display it. Since the gradual reduction of the directional layer 510 is substantially identical to the gradual increase of the directional layer 510 in step S403 of FIG. 4 (i.e., the gradual reduction is opposite to the gradual increase), redundant description is omitted.

When the gradual reduction of the directional layer 510 is completed, the control unit may restore the dimly-displayed application screen 502 to the previous screen. The application screen 502 restored to the previous screen is substantially identical to the application screen 504 displayed on the external device B 200. The control unit may permanently store sharing information stored in a storage unit, in order for history management.

Although the portable device A 100 and the external device B 200 having the same screen size are described according to the embodiments of the present invention (refer to FIG. 5A to FIG. 18), the present invention is also applied to the case in which the portable device A 100 and the external device B 200 have different screen sizes. As such, the present invention is not limited to a screen size. The screen size of a portable device according to an embodiment of the present invention may include a small size (e.g., less than about 5 cm diagonally) to a middle size (e.g., less than about 30 cm diagonally). Additionally, the screen size of a portable device according to an embodiment of the present invention may include a large size (e.g., less than about 100 cm diagonally) to a super large size (e.g., less than about 200 cm diagonally).

An application screen size and resolution displayed according to the size and resolution of a touch screen of the external device B 200 may be different from an application screen and resolution of the portable device A 100.

The control unit may provide feedback to a user in response to content transmission of the external device B 200. The provided feedback may be provided as at least one of a visual feedback, an auditory feedback, and a haptic feedback. For example, the control unit may provide to a user a combination of a visual feedback, an auditory feedback, and a haptic feedback.

The visual feedback may display on the touch screen a visual effect (e.g., an animation effect such as fade applied to an additional image besides the directional layer 510) responding to the content transmission of the external device B 200. The auditory feedback, as a sound responding to the content transmission of the external device B 200, may be outputted from one of the first speaker 163a and the second speaker 163b, or both the first speaker 163a and the second speaker 163b. Additionally, the haptic feedback, as a vibration responding to the content transmission of the external device B 200, may be outputted from the vibration motor 164. At least one feedback may be maintained from the transmission start to the transmission completion of the external device 200. Through preferences of the user in the OS, a feedback (e.g., as at least one of a visual feedback, an auditory feedback, and a haptic feedback) corresponding to the content transmission of the external device B 200 may be selected and/or modified. Additionally, a time (e.g., about 500 msec) during which at least one feedback corresponding to the content transmission of the external device 200 is provided to a user may be set and/or modified.

When a home screen is displayed on a touch screen according to another embodiment of the present invention, a transmitted content is a home screen and the home screen is transmitted to the external device B 200 in step S408 of FIG. 4. Since the transmission of the home screen 191 to the external device B 200 is substantially identical to step S408 of FIG. 4, redundant description is omitted.

When two application screens 502 and 504 are displayed, the screen displaying method of the portable device 100 is terminated.

When the external device is not connected in step S404 of FIG. 4, the control unit proceeds to step S409.

In step S409 of FIG. 4, the directional layer is gradually reduced.

Figure 8B:
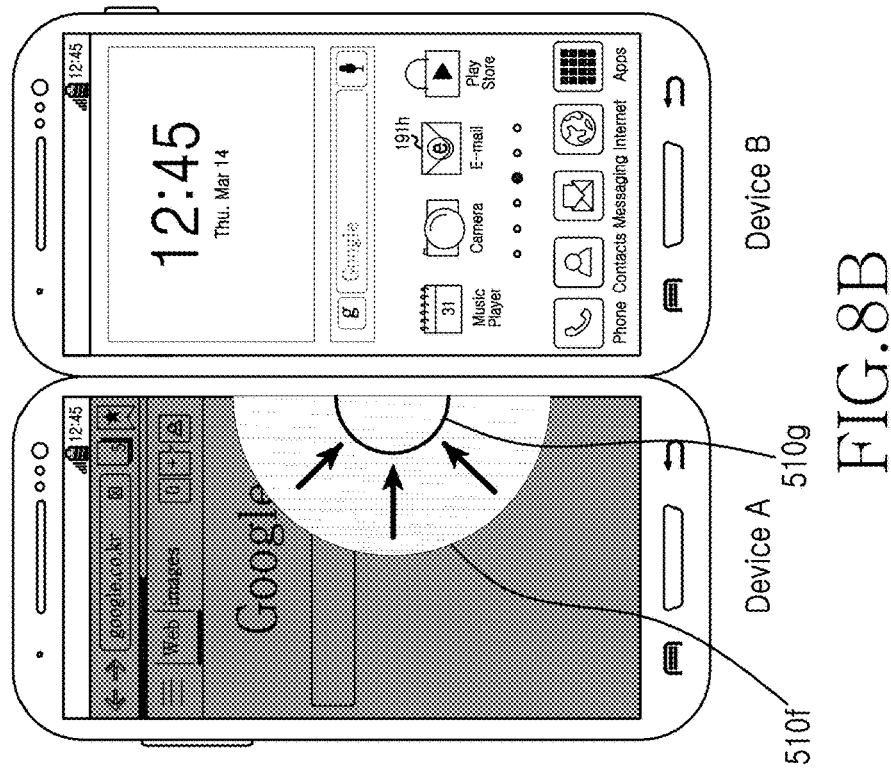
FIGS. 8A and 8B are views illustrating a screen displaying method of a portable device according to an embodiment of the present invention.
Figure 8A:
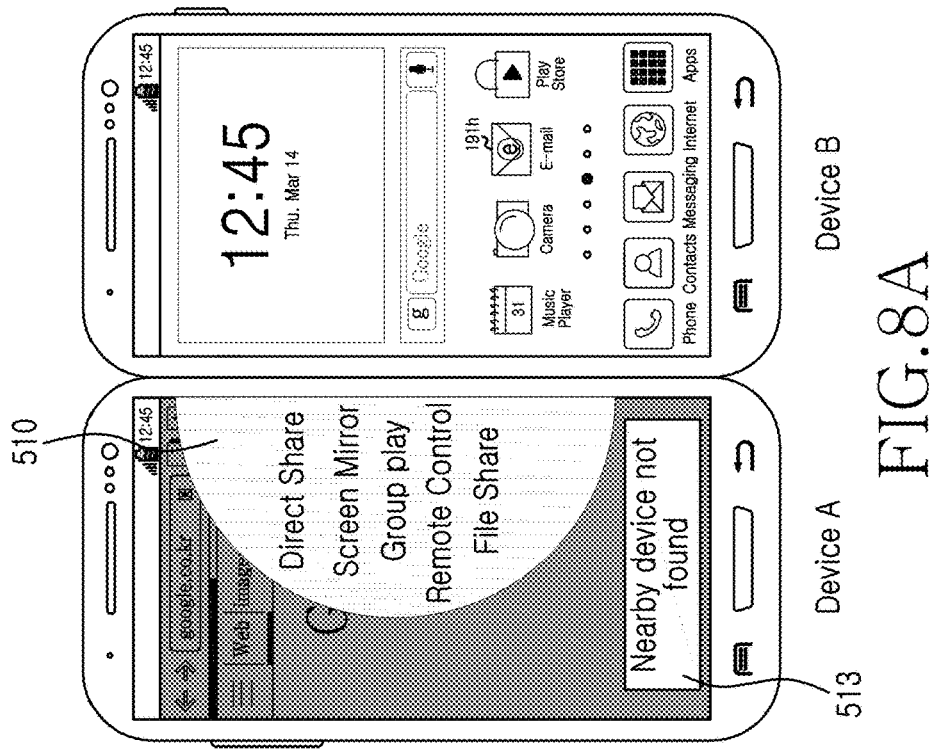

Referring to FIG. 8A and FIG. 8B, when the external device B 200 is not connected, the control unit displays a notification 513 corresponding to "Nearby device not found" on one side of the directional layer 510. The control unit may display notification message 513 for only a predetermined time (e.g., less than about 1 sec).

The control unit may not display the command list 511, or the control unit may gradually reduce the area of the displayed directional layer 510 (e.g., 510c→510f→510g).

Figure 9B:
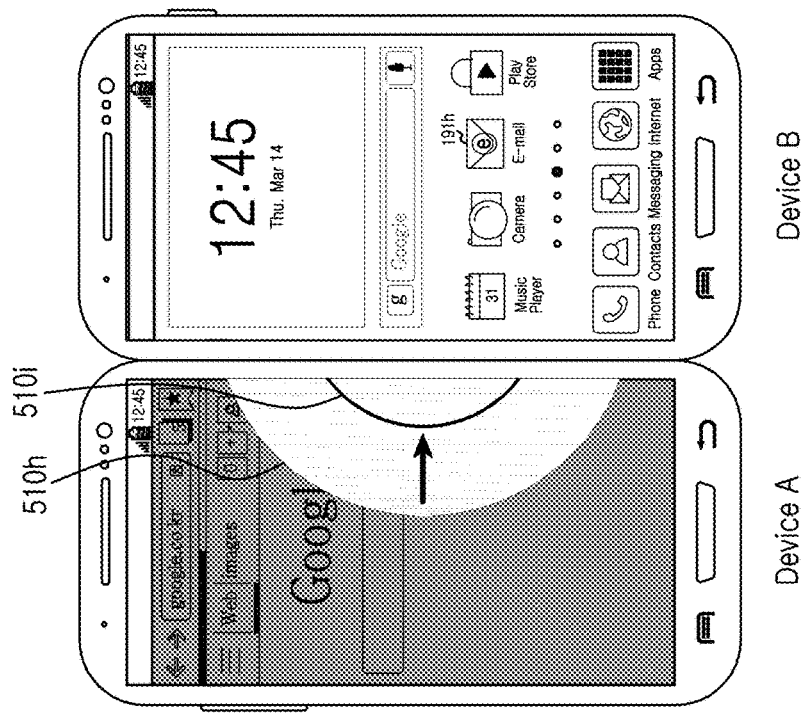
FIGS. 9A and 9B are views illustrating a screen displaying method of a portable device according to an embodiment of the present invention.
Figure 9A:
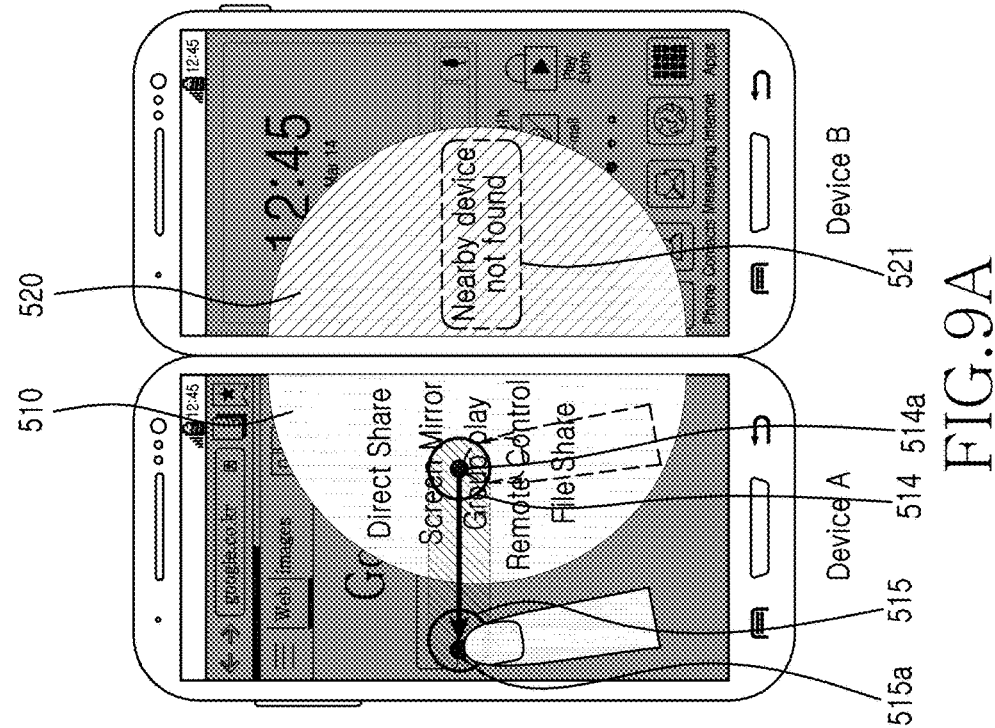

According to another embodiment of the present invention, the connection between the portable device A 100 and the external device B 200 may be terminated manually. Referring to FIG. 9A and FIG. 9B, a touch 514 inputted by a user is detected from the directional layer 510. The control unit detects a touch 514 from the directional layer 510 through the touch screen 190 and a touch screen controller 195. The control unit receives position information (e.g., X1 and Y1 coordinates corresponding to a touch position 514a) corresponding to the touch 514 from the touch screen controller 195. The control unit may store in a storage unit a touch on the touch screen 190 in the received second position information, a touch detection time (e.g., 12:45), and touch information (e.g., a touch duration time and a touch pressure) corresponding to the touch. The touch 514 detected from the directional layer 512 may be generated by one of the user's fingers or through the touch input unit 167.

A continuous movement of the touch 514 inputted by a user is detected from the touch screen 190. Through the touch screen 190 and the touch screen controller 195, the control unit detects a continuous movement (e.g., a plurality of X and Y coordinates corresponding to a continuous touch from an initial touch position 514a to a final touch position 515a) of the touch 514 in the left direction (e.g., an opposite direction to an approaching direction of the external device B 200) on the basis of the initial touch position 514a. The control unit may receive a plurality of position information (e.g., a plurality of X2 and Y2 coordinates corresponding to the continuous touch) corresponding to the continuous movement of the touch 514 from the touch screen controller 195.

The continuous movement of the touch 514 may include a continuous movement (e.g., 90°≤angle≤270° on the basis of the touch position 514a) from a direction (e.g., 90° on the basis of the touch position 514a) of the first camera 151 of the initial touch 514a to a direction (e.g., 270° on the basis of the touch position 514a) of the home button 161a of the touch 514. Those skilled in the art may easily understand that a continuous movement direction of the touch 514a may be changed according to the rotation of the portable device 100.

The continuous movement of the touch 514 may be maintained continuously from the initial touch position 514a to the final touch position 515a. The control unit detects a plurality of touch positions between the initial touch position 514a and the final touch position 515a, from the touch screen controller 195.

The continuous movement of the touch 514 may mean that a contact of more than a predetermined distance (e.g., about 10 mm) from the initial touch position 514a to the final touch position 515a is continuously maintained. Referring to the user's preference in the OS, the predetermined distance may be set and/or changed through a minimum distance setting for continuous movement of touch.

In response to the continuous movement of the touch 514, the control unit may display a notification 521 corresponding to "Nearby device not found" on a sub directional layer 520 of the external device B 200. In response to the continuous movement of the touch 514, the control unit of the external device B 200 may display a notification 521 corresponding to "Nearby device not found" on the sub directional layer 520.

When an external device is not connected, the control unit does not display the command list 511. Additionally, the control unit may reduce the area of the displayed directional layer 510 gradually (e.g., 510c→510h→510i).

Referring to FIG. 8B and FIG. 9B, the control unit may differently display the area of the directional layer 510 due to the reason that an external device is not connected (e.g., an external device is not connected by a user's input). For example, the area reduction (510c→510f→510g) of the directional layer 510 when "Nearby device not found" is determined by the control unit may be different from the area reduction (510c→510f→510g) of the directional layer 510 when "Nearby device not found" is determined by a user's input. When a directional layer is reduced gradually the control unit may restore the dimly-displayed application screen 502 to the previous screen. When the control unit restores and displays the application screen 502, the screen displaying method of the portable device 100 is terminated.

When transmission to the external device B 200 is unavailable in step S406 of FIG. 4, it proceeds to operation S409.

In step S409 of FIG. 4, the directional layer is gradually reduced.

Referring to FIG. 10A and FIG. 10B, the directional layer 510 of the portable device A 100 may be the same but the sub directional layer 520 of the external device B 200 may be different. The control unit may transmit "Unable to Direct Share" to the external device B 200 through a communication unit. The control unit of the external device B 200 may display a notification 522 corresponding to "Unable to Direct Share" on a touch screen in response to the received control signal. Additionally, in response to the control signal received through a communication unit, the control unit may display the sub directional layer 510 of the external device B 200 as a third color (e.g., red) sub directional layer 520b. Additionally, the control unit of the external device B 200 may display the sub directional layer 510 as a third color (e.g., red) sub directional layer 520b on the basis of a transmitted reply.

The control unit gradually reduces the area of the displayed directional layer 510 (e.g., 510c→510f→510g of FIG. 8). When the directional layer 510 is not displayed any more, the control unit displays a notification message 516 corresponding to "D2D Connection is ended". The control unit may display the notification message 516 for only a predetermined time (e.g., less than about 1 sec).

When the notification message 516 is not displayed any more, the control unit restores the dimly-displayed application screen 502 to the previous screen. When the application screen 502 restored to the previous screen is displayed, this is substantially identical to step S401 of FIG. 4.

When transmission to the external device B 200 is unavailable in operation S406 of FIG. 4, the control unit may perform only the operation of FIG. 10B, or the control unit may perform only the operation of FIG. 9B.

When the control unit displays the restored application screen 502, the screen displaying method of the portable device 100 is terminated.

FIGS. 11A to 15B are views illustrating a screen displaying method of a portable device according to another embodiment of the present invention.

A flowchart illustrating a screen displaying method of a portable device according to another embodiment of the present invention will be described with reference to FIG. 4.

In step S401 of FIG. 4, a touch screen displays the screen of an application.

Referring to FIG. 11A, an application screen 530 (e.g., a gallery screen) is displayed on the touch screen 190. Folders 530a and 530b and a plurality of photos 530c to 530f may be displayed on the application screen 530. Since step S401 of FIG. 4 has been described above, a redundant description is omitted.

In step S402 of FIG. 4, a direction of an approaching external device is detected.

Referring to FIG. 11A and FIG. 11B, the control unit detects the external device B 200 approaching from the right of the portable device A 100 through the geometric sensor 172. Since step S402 of FIG. 4 has been described above, a redundant description is omitted.

In step S403 of FIG. 4, a directional layer is displayed.

Referring to FIG. 11B to FIG. 16B, the control unit overlaps the directional layer 540 corresponding to the external device B 200 approaching from the right, on the application screen 520, and then displays it. The directional layer 540 may be separate from the application screen 530. Since step S403 of FIG. 4 has been described above, a redundant description is omitted.

In step S404 of FIG. 4, the control unit determines whether an external device is connected.

In correspondence to an approach of the external device B 200 (e.g., a detected magnetic intensity is more than about 150 μT), the control unit establishes wireless connection with the external device B 200 through the mobile communication unit 120 or the sub communication unit 130. The control unit may establish wireless connection with the external device B 200 through the wireless LAN unit 131 or the short distance communication unit 132 corresponding to an approach of the external device B 200.

Since step S404 of FIG. 4 has been described above, a redundant description is omitted.

When an external device is connected in step S404 of FIG. 4, the control unit proceeds to step S405.

In step S405 of FIG. 4, a touch is detected from the commands displayed on the directional layer.

Referring to FIG. 12A to FIG. 13B, a touch 542 inputted by a user is detected from a command (e.g., a file share 541e) of the command list 541. The control unit may detect a touch from the command 541e through the touch screen 190 and the touch screen controller 195. The control unit receives position information (e.g., X1 and Y1 coordinates corresponding to a touch point 542a) corresponding to the touch 542 from the touch screen controller 195.

The control unit may store in a storage unit a touch on the touch screen 190 in the received second position information, a touch detection time (e.g., 12:45), and touch information (e.g., a touch duration time and a touch pressure) corresponding to the touch. The touch 541 detected from the command list 542 may be generated by one of the user's fingers or through the touch input unit 167. In step S405 of FIG. 4, a touch is detected from the command 541e of the command list 541 but is not limited thereto. According to another embodiment of the present invention, a touch may be detected from the commands 541b to 541e displayed on the command list 541. When a touch is detected from the external device B 200, content may be transmitted in an opposite direction to the case where the touch 542 is detected from the portable device A 100.

In step S406 of FIG. 4, it is confirmed whether transmission to the external device B 200 is available.

The control unit determines whether the content transmission to the external device B 200 is available in response to the touch 542 detected from the command 541e in the command list 541 of FIG. 4. Since step S406 of FIG. 4 has been described above, a redundant description is omitted.

In step S407 of FIG. 4, content is selected.

Referring to FIG. 12A, the control unit may not temporarily display the directional layer 540 (e.g., until content is selected by a user) in response to the touch 542 for the command 541e. When content is selected by a user, the control unit restores the application screen 530. The control unit may detect a selection of the image files 530c and 530d from the dimly-displayed application screen 530 by a user's selection. The control unit may store in a storage unit image information (e.g., the name, type or storage location in a storage unit of an image file) corresponding to the selected image files 530c and 530d. The storage unit may permanently store in a storage unit the temporarily-stored image information in order for history management.

Figure 15:
FIG. 15 is a view illustrating a screen displaying method of a portable device according to another embodiment of the present invention.

Referring to FIG. 15, according to another embodiment of the present invention, the control unit may change a geometric figure of the directional layer 540 (e.g., a circle to a star) in response to the type (e.g., an image file) of a selected content. When the geometric figure is changed, the control unit displays the geometric figure (e.g., a star) in a substantially identical manner to the geometric figure (e.g., a circle) displayed on the portable device A 100 and the external device B 200 before the change. For example, a portion (e.g., ½ or ¼) of the geometric figure may be displayed. The control unit transmits a control signal corresponding to the changed geometric FIG. 540*d* to the external device B 200 through a communication unit.

The control unit of the external device B 200 displays the sub directional layer 550*d* by using the received control signal corresponding to the changed geometric FIG. 540*d*.

In step S408 of FIG. 4, the content is transmitted to the external device 200.

Figure 14B:
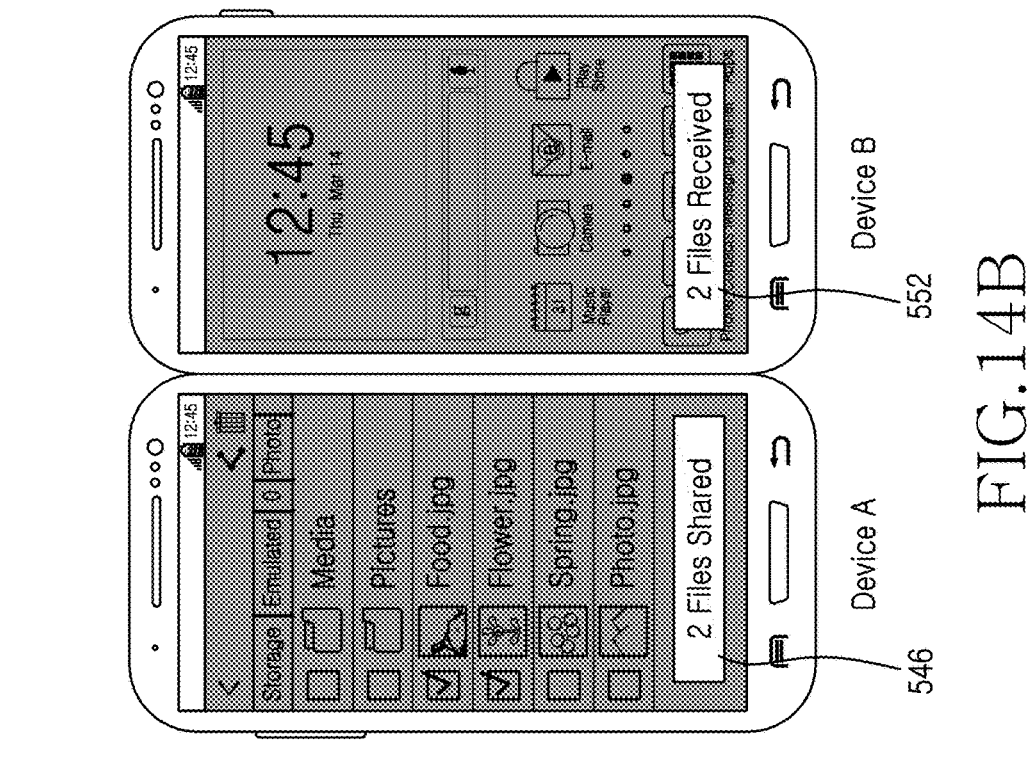
FIGS. 14A and 14B are views illustrating a screen displaying method of a portable device according to another embodiment of the present invention.

Referring to FIG. 12B and FIG. 14B, the image files 530*c* and 530*d* selected from the application screen 502 of the portable device A 100 are direct-shared and transmitted to the external device B 200. The control unit may transmit the image files 530*c* and 530*d* stored in a storage unit to the external device B 200 through a communication unit.

Referring to FIG. 12B, the control unit displays a notification 543 corresponding to "2 files selected Share now?" on the directional layer 540 in response to the selection on the image files 530*c* and 530*d*. The control unit detects a touch 545 inputted by a user from "yes" 544*a* and "no" 544*b* displayed together with the notification 543. When touch is detected from "yes", the control unit may stop displaying the notification 543, "yes" 544*a*, and "no" 544*b*.

Figure 13B:
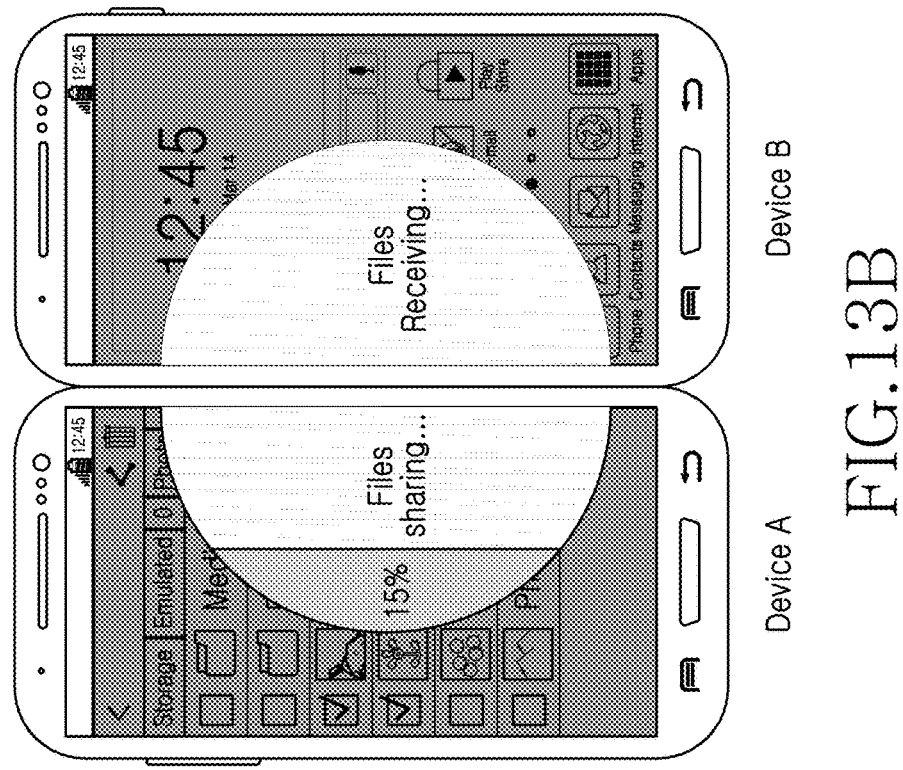
FIGS. 13A and 13B are views illustrating a screen displaying method of a portable device according to another embodiment of the present invention.
Figure 13A:
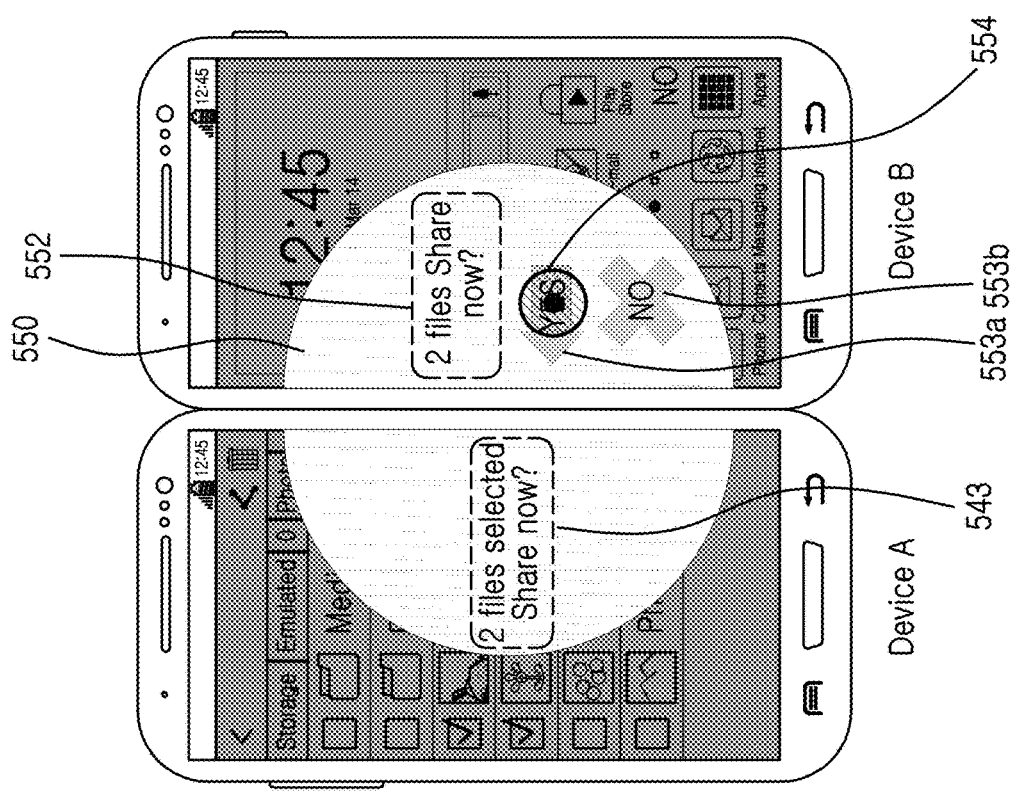

Referring to FIG. 13A, the control unit may transmit a request on whether file share is available (e.g., a control signal) to the external device B 200 through a communication unit in response to the touch 545 of "yes" 544*a*.

The control unit of the external device B 200 displays a notification 552 corresponding to "2 files selected Share now?" on the sub directional layer 550 in response to the received sharing request. The control unit of the external device B 200 detects a touch 554 inputted by a user from "yes" 553*a* and "no" 553*b* displayed together with the notification 552. When touch is detected from "yes" 553*a*, the control unit of the external device B 200 may stop displaying the notification 552, "yes" 553*a*, and "no" 553*b*.

The control unit may receive a reply on whether file sharing is available (e.g., a control signal corresponding to "yes") from the external device B 200 through a communication unit.

Figure 14A:
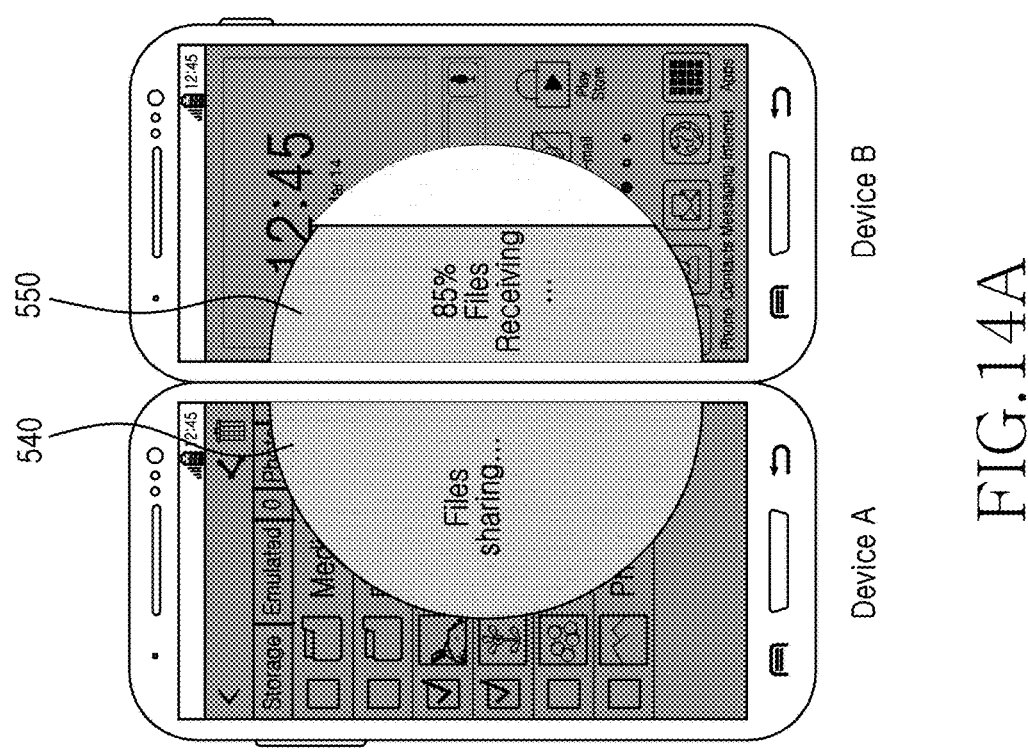

Referring to FIG. 13B and FIG. 14A, the control unit transmits the image files 530*c* and 530*d* to the external device B 200 by using image information stored in a storage unit through a communication unit in response to a reply on file share. The control unit may display a file transmission progression on the directional layer 540 in response to the transmission of the image files 530*c* and 530*d*. The control unit may display the directional layer 540 being different from before the time of transmission corresponding to the file transmission progression. For example, in FIG. 13B, the control unit may display an area (e.g., progression gradation) in a directional layer having a file transmission progression of about 15% to be different from an area (e.g., progression gradation) in a directional layer having a file transmission progression of about 85%, in FIG. 14A. When the area in the directional layer 540 is filled completely, in FIG. 14A, the control unit may display the file transmission progression as about 85%. When the area in the sub directional layer 550 of the external device B 200 is filled completely, the control unit may display the file transmission progression on the directional layer 540 as about 100%.

The control unit may transmit a control signal corresponding to image file transmission progression to the external device B 200 through a communication unit.

The control unit may provide feedback to a user in response to content file transmission progression. The provided feedback may be provided as at least one of a visual feedback, an auditory feedback, and a haptic feedback. For example, the control unit may provide to a user a combination of a visual feedback, an auditory feedback, and a haptic feedback.

At least one feedback may be maintained from the transmission start to the transmission completion of the external device B 200. Through user preferences set in the OS, a feedback (e.g., as at least one of a visual feedback, an auditory feedback, and a haptic feedback) corresponding to the content transmission of the external device B 200 may be selected and/or modified. Additionally, a time (e.g., about 0.5 sec) taken for providing at least one feedback to a user may be selected and/or modified in the playlist display setting.

The control unit of the external device B 200 may display the sub directional layer 550 corresponding to a control signal (e.g., a transmission progression of the image files 530*c* and 530*d*) received through a communication unit.

Referring to FIG. 14B, when file progression is about 100%, the control unit displays a notification 546 corresponding to "2 files shared" on the directional layer 540. The control unit of the external device B 200 displays a notification 552 corresponding to "2 files received" on the sub directional layer 550.

When the file share is completed, the control unit restores the application screen 530 to the previous screen. When the application screen 530 restored to the previous screen is displayed, this is substantially identical to step S401 of FIG. 4.

When the file reception is completed, the control unit of the external device B 200 restores the application screen to the previous screen. When the application screen restored to the previous screen is displayed, this is substantially identical to step S401 of FIG. 4.

When the restored application screen is displayed on the portable device A 100 and the external device B 200, the screen displaying method of the portable device A 100 is terminated.

When the external device B 200 is not connected in step S404 of FIG. 4, it proceeds to step S409.

In step S409 of FIG. 4, the directional layer is gradually reduced.

When the external device B 200 is not connected, the control unit displays a notification message corresponding to "Nearby device not found" on one side of the directional layer 540. Since step S409 of FIG. 4 has been described above, a redundant description is omitted.

When the control unit restores and displays the application screen 502, the screen displaying method of the portable device A 100 is terminated.

When transmission to the external device B 200 is unavailable in step S406 of FIG. 4, it proceeds to step S409.

In step S409 of FIG. 4, the directional layer is gradually reduced.

The directional layer 510 of the portable device A 100 may be the same but the sub directional layer 520 of the external device B 200 may be different. The control unit may display a notification message 522 corresponding to "Unable to Direct Share" on a touch screen of the external device 200 in response to the reply received through a communication unit. Since step S409 of FIG. 4 has been described above, a redundant description is omitted.

When the control unit restores and displays the application screen 502, the screen displaying method of the portable device 100 is terminated.

Figure 17:
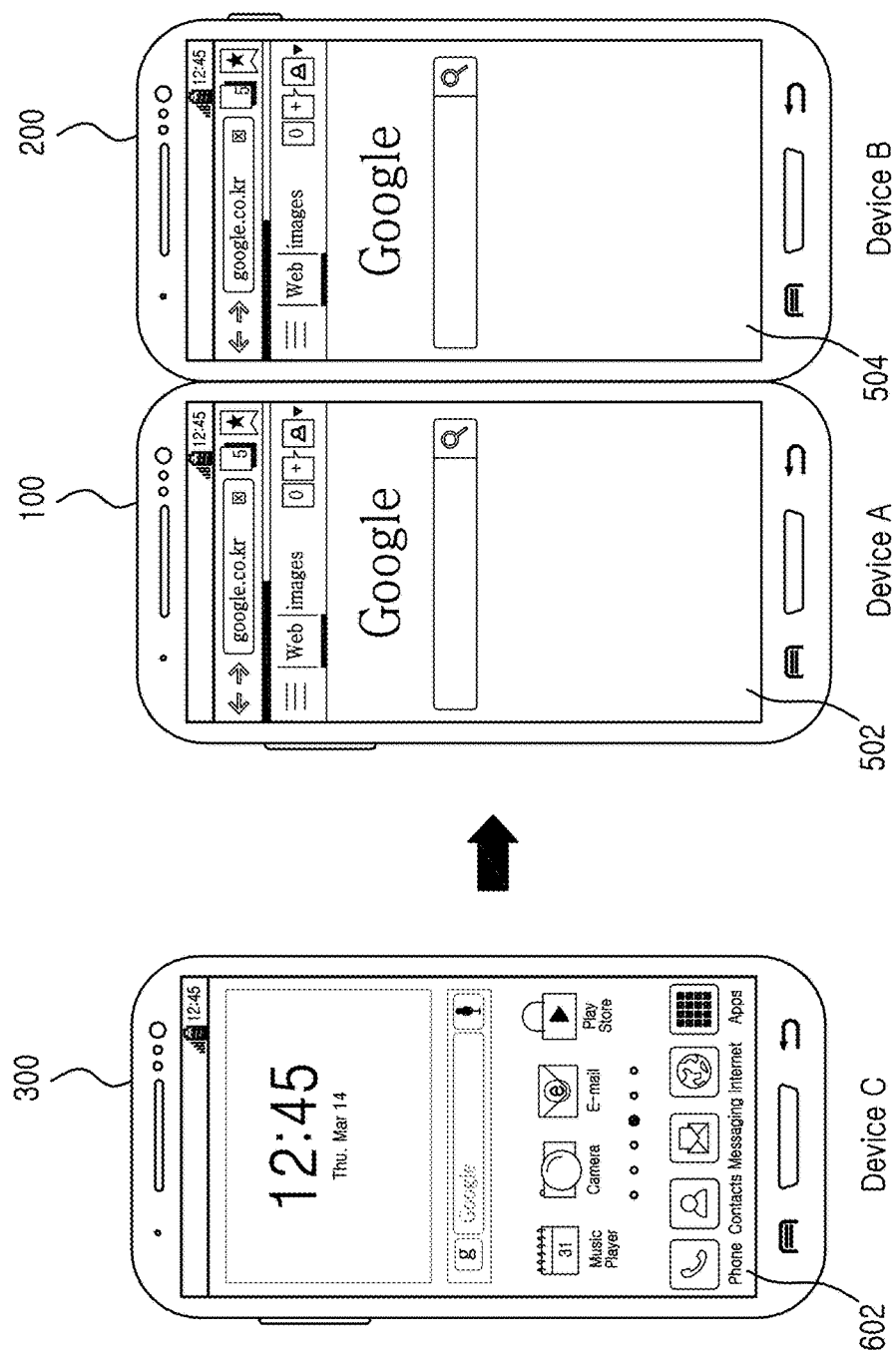
FIGS. 17 to 19 are views illustrating a screen displaying method of a portable device according to another embodiment of the present invention.
Figure 18:
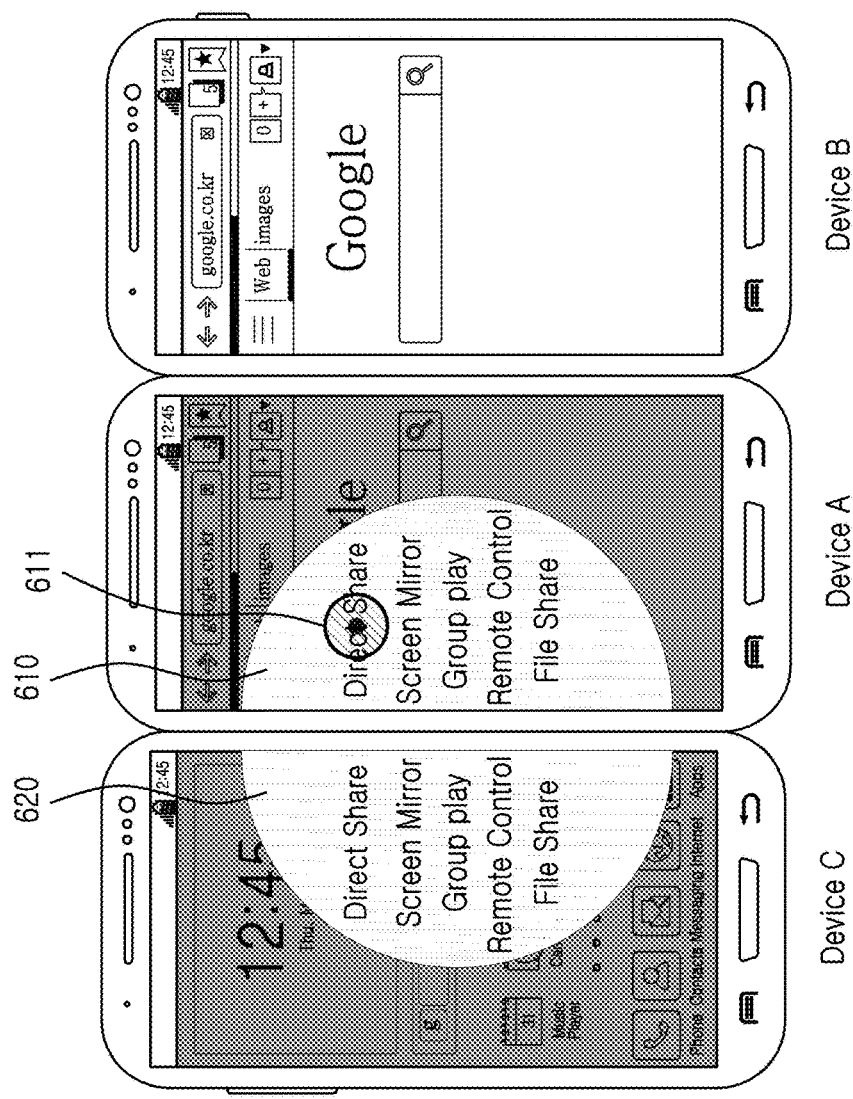
Figure 19:
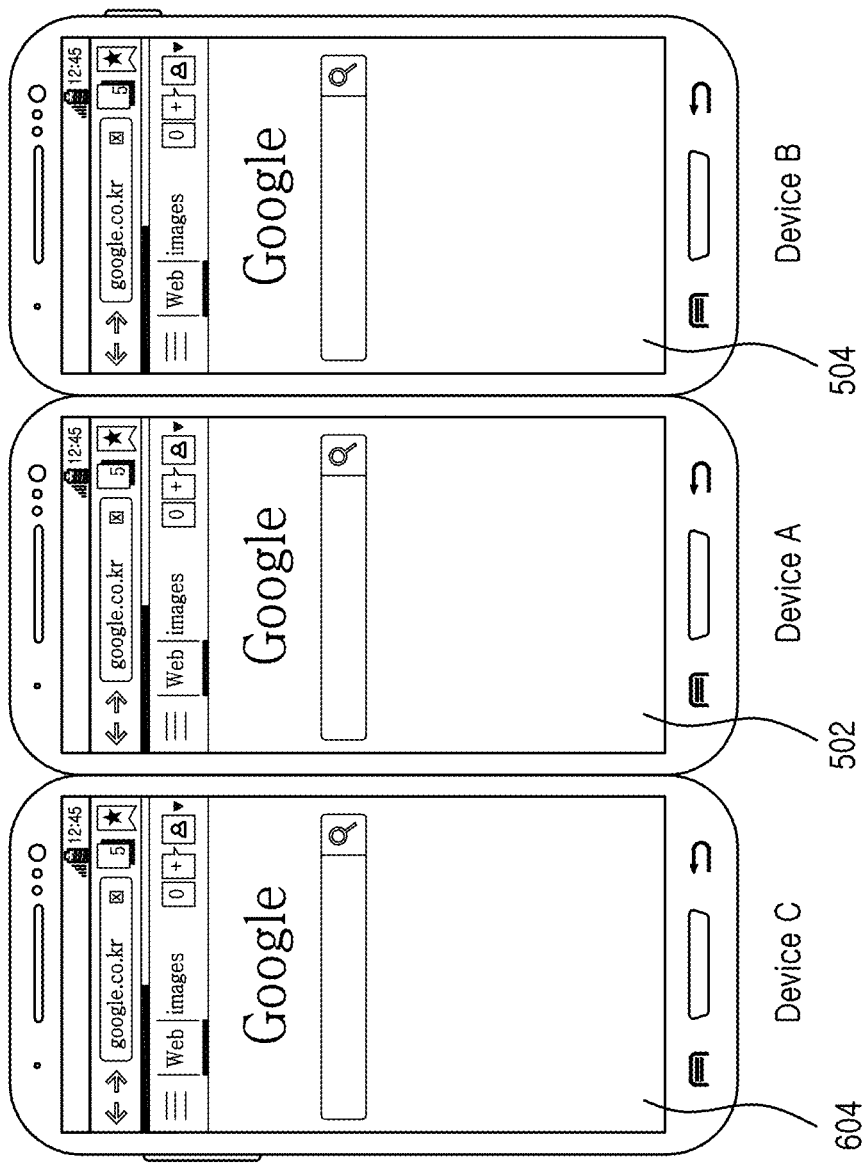

FIGS. 17 to 19 are views illustrating a screen displaying method of a portable device according to another embodiment of the present invention.

Referring to FIG. 17, while the portable device A 100 is connected (e.g., step S404 of FIG. 4) to the external device B 200 approaching from the right of the portable device A 100 (e.g., the applications screens 502 and 504), another external device C 300 displaying a home screen 602 may approach from the left of the portable device A 100.

The control unit detects the other external device C 300 approaching from the left through the sensor unit 170. The control unit may connect to the other external device C 300 wirelessly in response to an approach of the other external device 300.

Referring to FIGS. 18 and 19, the control unit displays a directional layer 610 in response to a connection to the other external device C 300. The control unit of the other external device C 300 displays a sub directional layer 620 corresponding to the directional layer 610. When the other external device C 300 is connected to the left of the portable device A 100, the position of the directional layer 610 and the position of the sub directional layer 620 are opposite to the case where the portable device A 100 is connected to the external device B 200 (e.g., the opposite of FIG. 6).

When a touch 611 is detected from a command displayed on the directional layer 610, the control unit transmits sharing information corresponding to the displayed application screen 502 to the other external device C 300. The control unit of the other external device C 300 displays the changed application screen 604 by using the received sharing information.

Since transmitting the displayed application screen 502 to the other external device C 300 and/or displaying the application screen 502 are substantially identical to the embodiments of FIG. 5A to FIG. 7B of the present invention described above, a redundant description is omitted.

Figure 20:
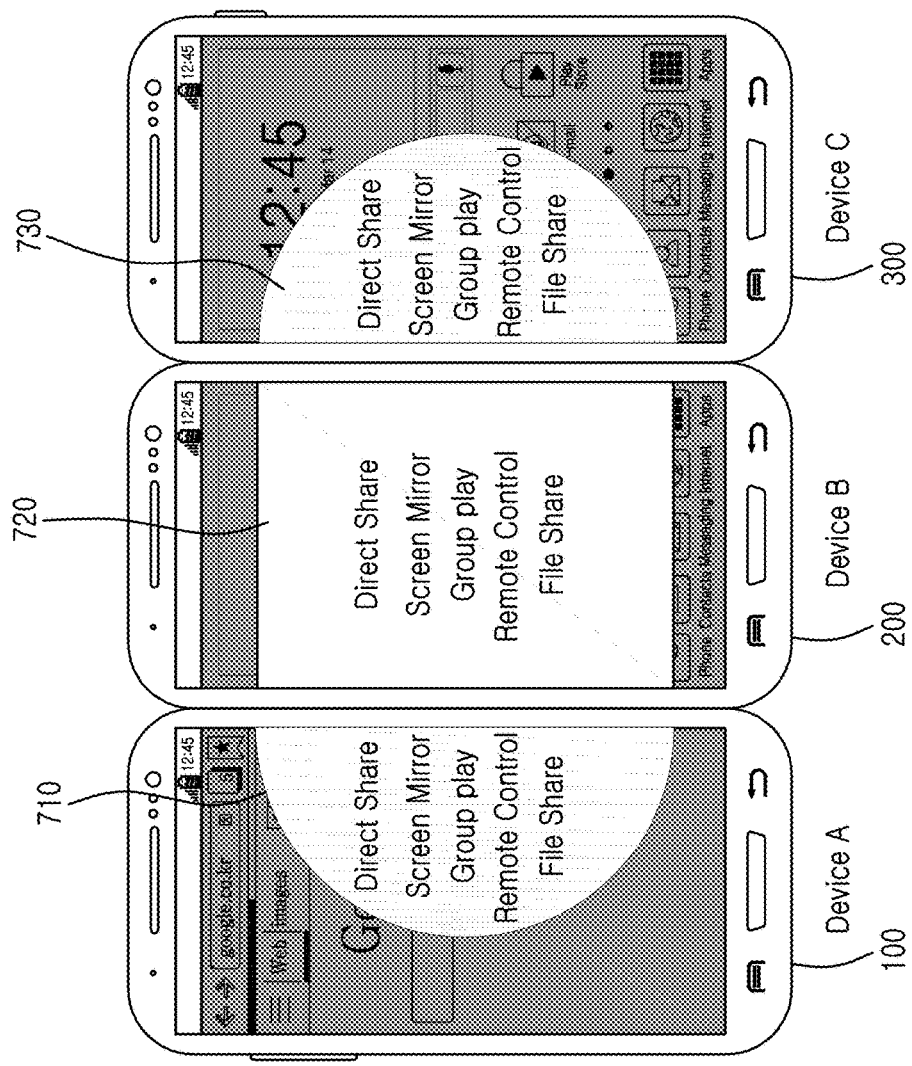
FIG. 20 is a view illustrating a screen displaying method of a portable device according to another embodiment of the present invention.

FIG. 20 is a view illustrating a screen displaying method of a portable device according to another embodiment of the present invention.

Referring to FIG. 20, the external device B 200, and the other external device C 300 are connected to the right of the portable device A 100.

The control unit detects an approaching direction of the external device B 200 and the other external device C 300 approaching from the right through the sensor unit 170. The control unit connects to the external device B 200 and the other external device C 300 wirelessly in response to an approach of the external device B 200 and the other external device C 300. Additionally, the control unit may detect an approaching direction of the other external device C 300 through a sensor unit of the external device B 200. The control unit may receive a control signal corresponding to an approaching direction of the detected other external device C 300 from the external device B 200 through a communication unit. The control unit may connect to the external device B 200 and the other external device C 300 wirelessly in response to an approach of the external device B 200 and the other external device C 300.

When the portable device A 100, the external device B 200, and the other external device C 300 are connected, the control unit of the external device B 200 and the control unit of the other external device C 300 may overlap and display each of a first sub directional layer and a second sub directional layer by using a control signal corresponding a directional layer on the portable device A 100. The control unit may overlap and display a directional layer on a touch screen.

The displayed directional layer 710, first sub directional layer 720, and second sub directional layer 730 may be displayed as one integrated geometric figure (e.g., a playground track shape). The directional layer (e.g., a semicircle 710) of the portable device A 100 is identical to the directional layer 510 of the portable device shown in FIG. 6A, and the sub directional layer (e.g., a semicircle 730) of the other portable device C 300 is identical to the sub directional layer 520 of the external device B 200 shown in FIG. 6A. The first sub directional layer (e.g., a square 720) may form one geometric figure by connecting the directional layer 710 of the portable device A 100 and the second sub directional layer 730 of the other portable device C 300.

When the portable device A 100, the external device B 200, and the other external device C 300 are connected to each other, sharing information corresponding to an application screen may be transmitted to the external device B 200 by using a touch detected from the directional layer 710 through a communication unit. The control unit of the external device B 200 may transmit the sharing information (e.g., temporarily stored) received from the portable device A 100 by using a touch detected from the first subdirectional layer 720 through a communication unit When the portable device A 100, the external device B 200, and the other external device C 300 are connected to each other, the control unit may selectively transmit sharing information corresponding to an application screen. When a touch is detected from a command displayed on the directional layer 710, the control unit may transmit sharing information corresponding to a displayed application screen to one of the external device B 200 and the other external device C 300. For example, the sharing information may be transmitted to only the external device B 200, only the other external device C 300, or both the external device B 200 and the other external device C 300.

The selective transmission of sharing information may be displayed on a connected device list (not shown) when a touch is detected from a command of the directional layer 710. The number of external devices in a device list displayed based on the number of connected external devices may vary. The control unit may detect a touch (e.g., from only the external device B 200, only the other external device C 300, or both the external device B 200 and the other external device C 300) for selecting a device to transmit an application screen from a displayed device list. For example, when only the other external device C 300 is selected, sharing information may include the name (e.g., unique information corresponding to the other external device C 300) of a device to transmit an application screen. When the received sharing information includes the name of the external device B 200 to transmit information, the control unit of the external device B 200 may display an application screen by using the received sharing information. When the received sharing information does not include the name of the external device B 200 to transmit information, the control unit of the external device B 200 may not display an application screen. When the received sharing information includes the name of the external device C 300 to transmit information, the control unit of the other external device C 300 may display an application screen by using the received sharing information.

Referring to FIG. 19, the portable device A 100, the external device B 200, and the other external device C 300 all display an application screen.

Since transmitting the displayed application screen to the external device B 200 or the other external device C 300 is substantially identical to the embodiments of FIG. 5A to FIG. 7B of the present invention described above (e.g., the transmission between the portable device A 100 and the external device B 200 or the other external device C 300), a redundant description is omitted.

Figure 21:
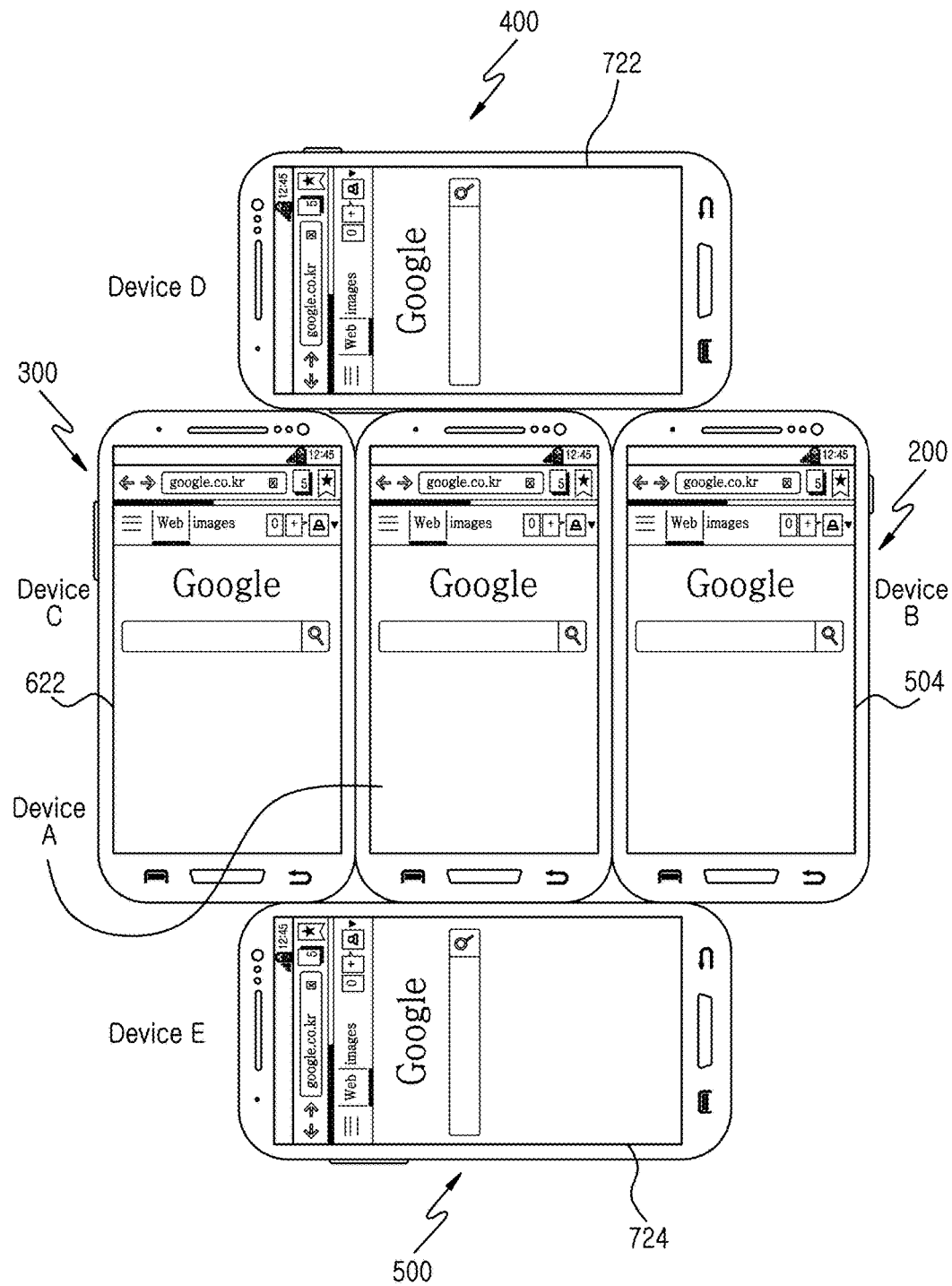
FIG. 21 is a view illustrating a screen displaying method of a portable device according to another embodiment of the present invention.

FIG. 21 is a view illustrating a screen displaying method of a portable device according to another embodiment of the present invention.

Referring to FIG. 21, external devices 200 to 500 are wirelessly connected to the four directions of the top, bottom, left, and right of the portable device A 100, the control unit transmits an application screen 502 to each of the external devices 200 to 500 in a determined order (e.g., top→bottom→left→right). It is apparent to those skilled in the art that the determined order may vary. The control units of the external devices 200 to 500 may display the received application screen 502 as application screens 504, 622, 722, and 724 on touch screens, respectively. Additional external devices (not shown) may be connected to each of the external devices 200 to 500 connected to the portable device A 100. For example, at least one another external device (not shown) at the right of the external device B 200, another external device (not shown) at the left of the external device C 300, another external device (not shown) at the top of the external device D 400, and another external device (not shown) at the bottom of the external device E 500 on the basis of the portable device A 100 may be connected.

Since transmitting the application screen 502 to the other external devices 200 to 500 through a communication unit is substantially identical to the embodiments of the present invention described above, a redundant description is omitted.

The embodiments of the present invention can be written as computer programs and can be implemented in general-use digital computers that execute the programs using a computer readable recording medium. The computer readable recording medium may include each or a combination of program commands, data files, and data structures. For example, examples of the computer readable recording medium include magnetic storage media (e.g., ROM, floppy disks, hard disks, etc.) and optical recording media (e.g., CD-ROMs, or DVDs). A memory in a mobile terminal is one example of a storage medium that can be read by a device for storing a program or programs including instructions for implementing embodiments of the present invention. The program instructions written on the medium may be designed and configured for the present invention or may be known to computer software engineers.

While the invention has been shown and described with reference to certain embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method in a portable device, the method comprising:
    displaying a screen of an executed application via a display of the portable device;
    detecting that an external device approaches the portable device, by detecting a magnetic intensity caused by the external device using a geomagnetic sensor of the portable device;
    identifying, while detecting that the external device approaches the portable device, a direction in which the external device approaches the portable device, by using the geomagnetic sensor;
    based on identifying the direction using the geomagnetic sensor, displaying, within a partial area including an edge corresponding to the direction included in an entire area of the display, a directional layer for indicating information to transmit a content associated with the portable device to the external device while detecting that the external device approaches the portable device, wherein the directional layer is superimposed partially on the screen of the executed application, wherein the directional layer is gradually enlarged in the direction from the edge by detecting that the external device gradually approaches the portable device;
    based at least on identifying that the magnetic intensity is greater than or equal to a designated intensity, establishing a connection with the external device;
    based on identifying that the establishment of the connection with the external device failed, gradually reducing the directional layer;
    based on receiving an input on the directional layer, transmitting a content to the external device; and
    in response to identifying that the transmitting is completed, gradually reducing the size of the directional layer to the edge of the screen.

2. The method of claim 1, wherein the directional layer comprises a menu including a command list, which activates and displays only executable commands.

3. The method of claim 1, wherein the displayed screen of the application is distinguished from the directional layer.

4. The method of claim 1, further comprising detecting a slope of the portable device by using a sensor,
    wherein the directional layer is displayed corresponding to the detected slope.

5. The method of claim 1, wherein the directional layer is provided as a portion of at least one geometric figure corresponding to the direction in which the external device approaches the portable device.

6. The method of claim 1, wherein the directional layer is provided as a portion of at least one geometric figure corresponding to a signal intensity received from the external device.

7. The method of claim 1, wherein a sub directional layer corresponding to the directional layer is displayed on a display screen of the external device.

8. The method of claim 1, further comprising:
    detecting a touch from the directional layer;
    detecting a continuous movement of the touch in an opposite direction to the detected direction; and
    allowing the directional layer to disappear in response to the continuous movement of the touch.

9. The method of claim 2, further comprising:
    detecting a touch from one command among the activated commands; and
    transmitting content corresponding to the command to the external device in response to the touch.

10. The method of claim 9, further comprising providing at least one of visual feedback, auditory feedback, and haptic feedback corresponding to a displayed content transmission progression between the portable device and the external device.

11. The method of claim 9, wherein one of a color of the directional layer and a color of a sub directional layer is changed in response to whether the content is transmitted to the external device.

12. The method of claim 9, wherein transmitting the content comprises:

receiving at least one selected content of a transmission target; and transmitting the at least one selected content to the external device.

13. The method of claim 9, wherein a request on whether sharing corresponding to the content transmission is available is transmitted to the external device.

14. The method of claim 9, wherein the content comprises at least one of the application screen, screen data configuring a screen, a uniform resource locator (URL), an image file, a text file, an audio file, a video file, and an android installation file.

15. The method of claim 14, wherein a geometric figure comprising the directional layer is changeable corresponding to the content.

16. A method in a portable device, the method comprising:

displaying a screen of an executed application via a display of the portable device;

detecting that an external device approaches the portable device, by detecting a magnetic intensity caused by the external device using a geomagnetic sensor of the portable device;

identifying, while detecting that the external device approaches the portable device, a direction in which the external device approaches the portable device, by using the geomagnetic sensor;

based on identifying the direction using the geomagnetic sensor, displaying, within a partial area including an edge corresponding to the direction included in an entire area of the display, a directional layer for indicating information to transmit a content associated with the portable device to the external device while detecting that the external device approaches the portable device, wherein the directional layer is superimposed partially on the screen of the executed application, and wherein the directional layer is gradually enlarged in the direction from the edge by detecting that the external device gradually approaches the portable device;

based at least on identifying that the magnetic intensity is greater than or equal to a designated intensity, establishing a connection with the external device; and based on identifying that the establishment of the connection with the external device failed, gradually reducing the directional layer, wherein establishing the connection with the external device comprises:

displaying a first sub directional layer corresponding to the directional layer, on the external device;

detecting an approaching direction of another external device connectible to the external device;

displaying a second sub directional layer corresponding to the directional layer, on the other external device, wherein the directional layer, the first sub directional layer, and the second sub directional layer form one geometric figure;

based on receiving an input on the directional layer, transmitting a content to the external device; and in response to identifying that the transmitting is completed, gradually reducing the size of the directional layer to the edge of the screen.

17. The method of claim 16, wherein detecting the direction of the another external device comprises detecting an approaching direction of the another external device by one of the portable device and the external device.

18. The method of claim 16, further comprising:

detecting a touch from a command of a command list displayed on the directional layer; and selectively transmitting content corresponding to the command to one of the external device and the another external device in response to the touch.

19. A portable device comprising:

a display;

a communication unit connectible to an external device;

a sensor unit comprising a geomagnetic sensor; and a control unit configured to control the screen, the sensor unit, and the communication unit, wherein the control unit is configured to:

display a screen of an executed application via the display;

detect that an external device approaches the portable device, by detecting a magnetic intensity caused by the external device using the geomagnetic sensor;

identify, while detecting that the external device approaches the portable device, a direction in which the external device approaches the portable device, by using the geomagnetic sensor;

based on identifying the direction, display, within a partial area including an edge corresponding to the direction included in an entire area of the display, a directional layer for indicating information to transmit a content associated with the portable device to the external device while detecting that the external device approaches the portable device, wherein the directional layer is superimposed partially on the screen of the executed application, wherein the directional layer is gradually enlarged in the direction from the edge by detecting that the external device gradually approaches the portable device;

based at least on identifying that the magnetic intensity is greater than or equal to a designated intensity, establish a connection with the external device;

based on identifying that the establishment of the connection with the external device failed, gradually reduce the directional layer;

based on receiving an input on the directional layer, transmitting a content to the external device; and in response to identifying that the transmitting is completed, gradually reducing the size of the directional layer to the edge of the screen.

20. The portable device of claim 19, wherein the sensor unit further comprises an acceleration sensor, and a gyro sensor.

21. The portable device of claim 19, wherein the control unit detects a touch from one command selected from a command list in the directional layer and transmits content corresponding to the command to the external device through the communication unit.

22. The portable device of claim 20, wherein the control unit provides at least one of visual feedback, auditory feedback, and haptic feedback corresponding to the transmission of the content.

23. A method in a portable device, the method comprising:

displaying a screen of an executed application via a display of the portable device;

detecting that an external device approaches the portable device, by detecting a magnetic intensity caused by the external device using a geomagnetic sensor;

identifying, while detecting that the external device approaches the portable device, a direction in which the external device approaches the portable device, by using the geomagnetic sensor;

based on identifying the direction using the geomagnetic sensor, displaying, within a partial area including an edge corresponding to the direction included in an entire area of the display, a directional layer for indicating information to transmit a content associated with the portable device to the external device while detecting that the external device approaches the portable device, wherein the directional layer is superimposed partially on the screen of the executed application, wherein the directional layer is gradually enlarged in the direction from the edge by detecting that the external device gradually approaches the portable device, wherein the directional layer is displayed as a portion of a geometric figure;

based at least on identifying that the magnetic intensity is greater than or equal to a designated intensity, establishing a connection with the external device;

based on identifying that the establishment of the connection with the external device failed, gradually reducing the directional layer;

based on receiving an input on the directional layer, transmitting a content to the external device; and in response to identifying that the transmitting is completed, gradually reducing the size of the directional layer to the edge of the screen.

24. The method of claim 23, further comprising detecting a magnetic intensity of the external device, wherein the directional layer is displayed to correspond to a magnetic intensity of the external device and an approaching direction of the external device.

* * * * *